E. HEDENSKOOG.
AUTOMATIC PIN SETTING MACHINE.
APPLICATION FILED JUNE 6, 1914.
1,190,648.
Patented July 11, 1916.
12 SHEETS—SHEET 4.
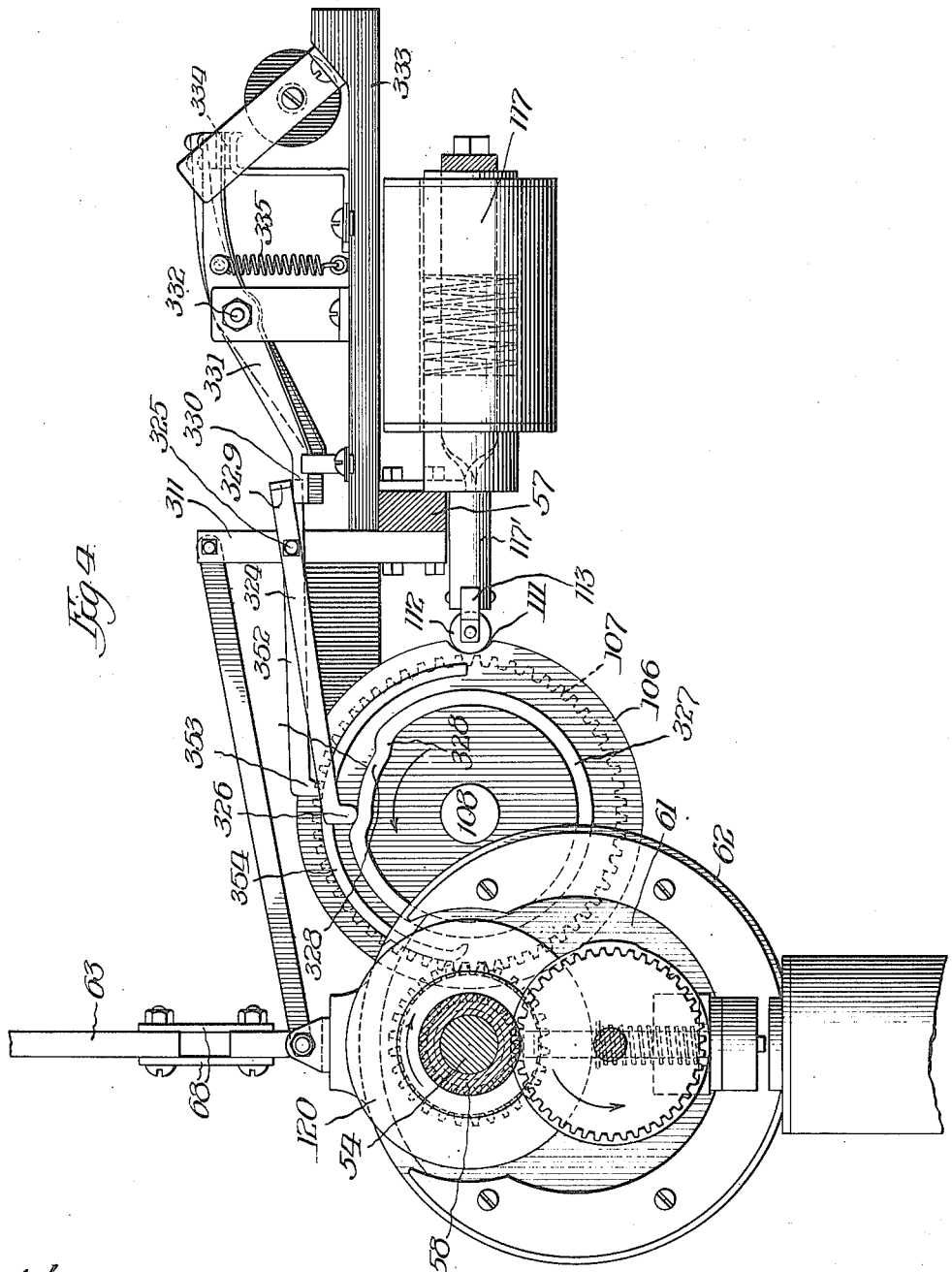

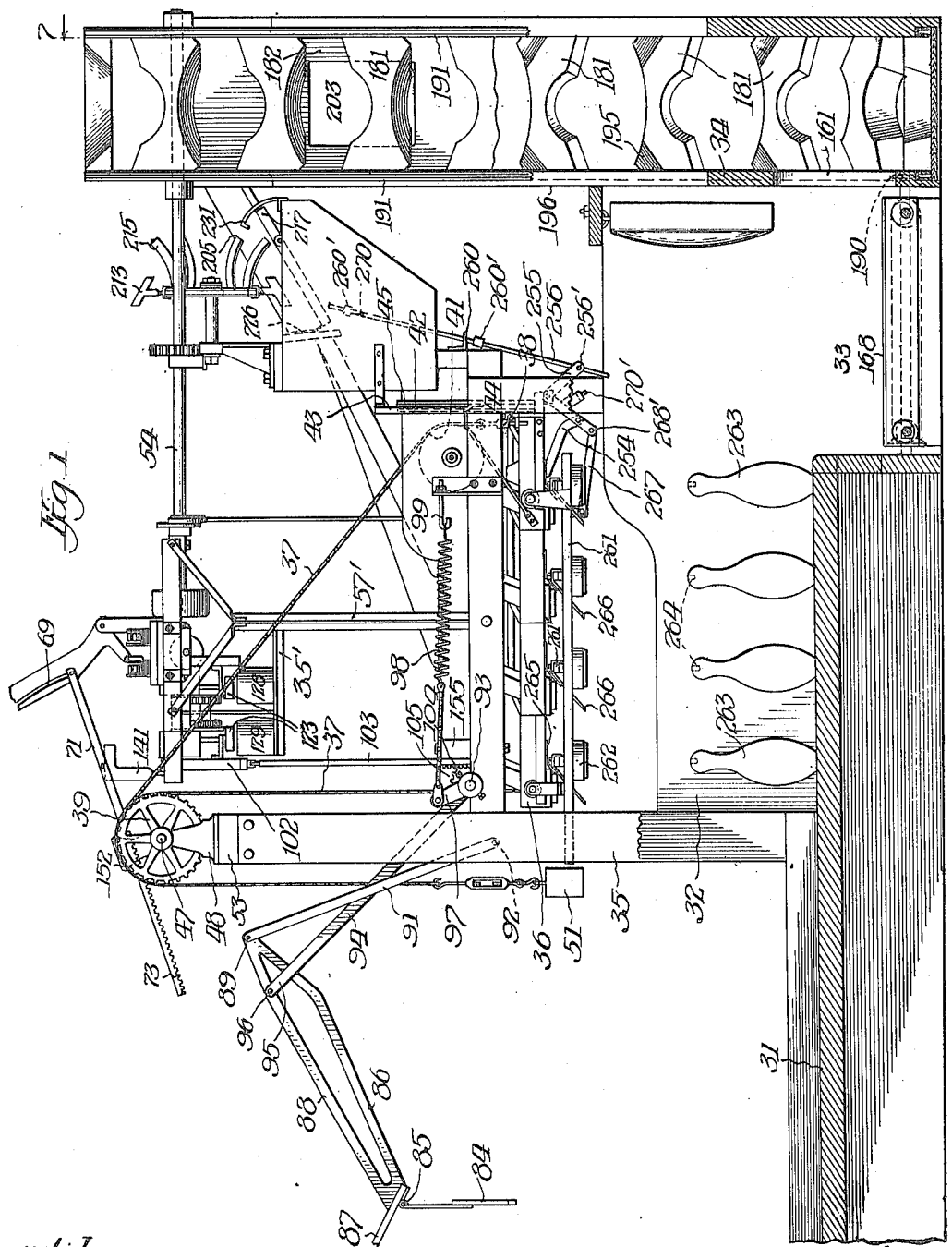

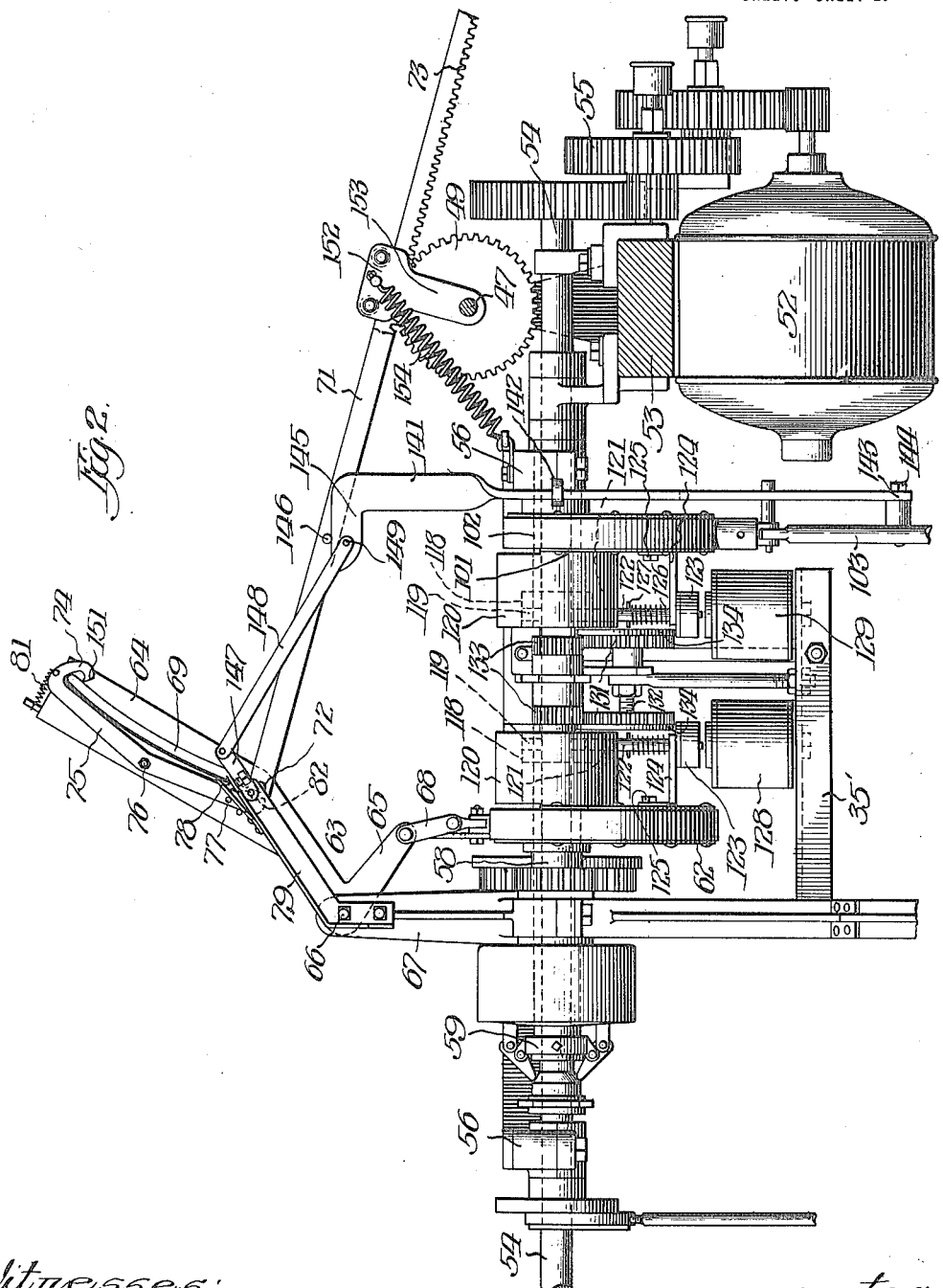

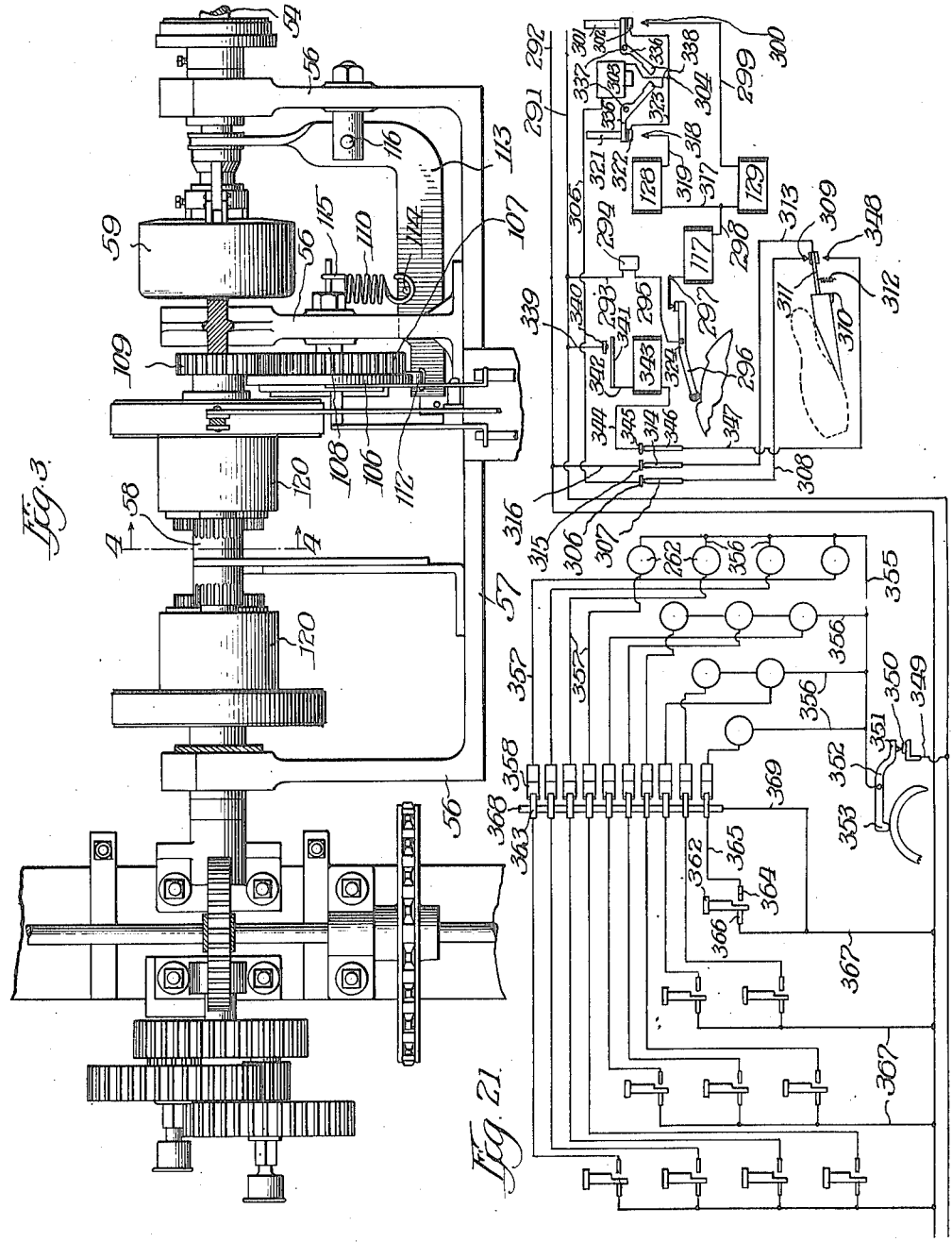

E. HEDENSKOOG.
AUTOMATIC PIN SETTING MACHINE.
APPLICATION FILED JUNE 6, 1914.
1,190,648.
Patented July 11, 1916.
12 SHEETS—SHEET 5.
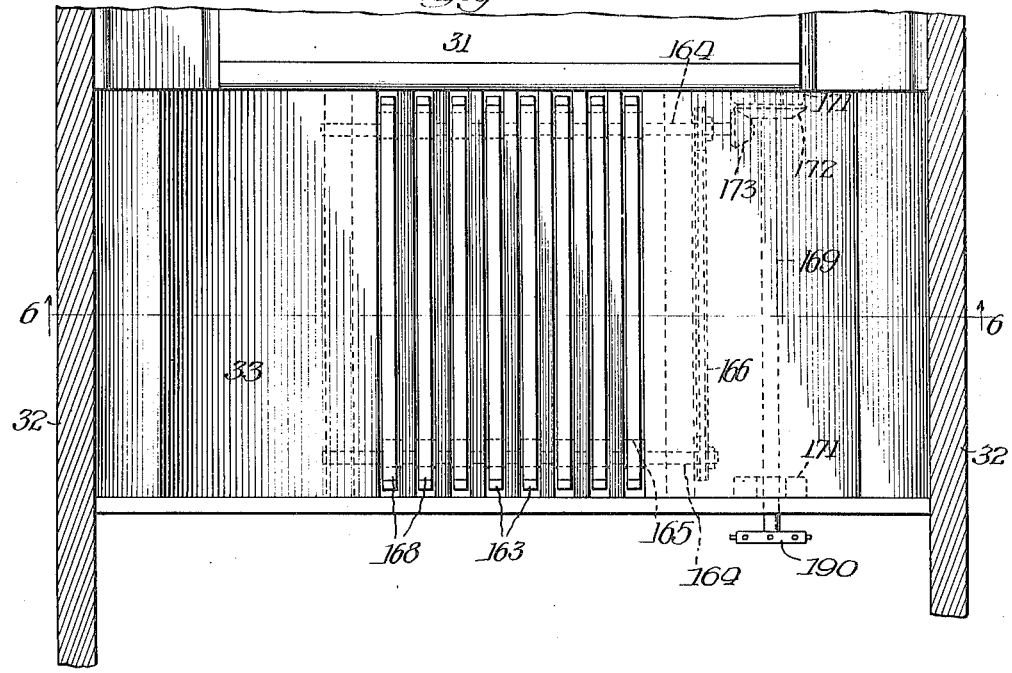
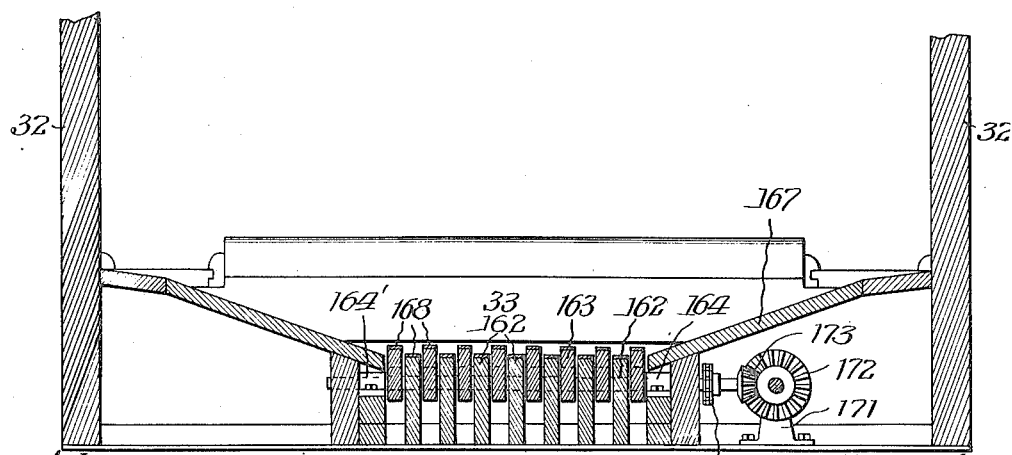

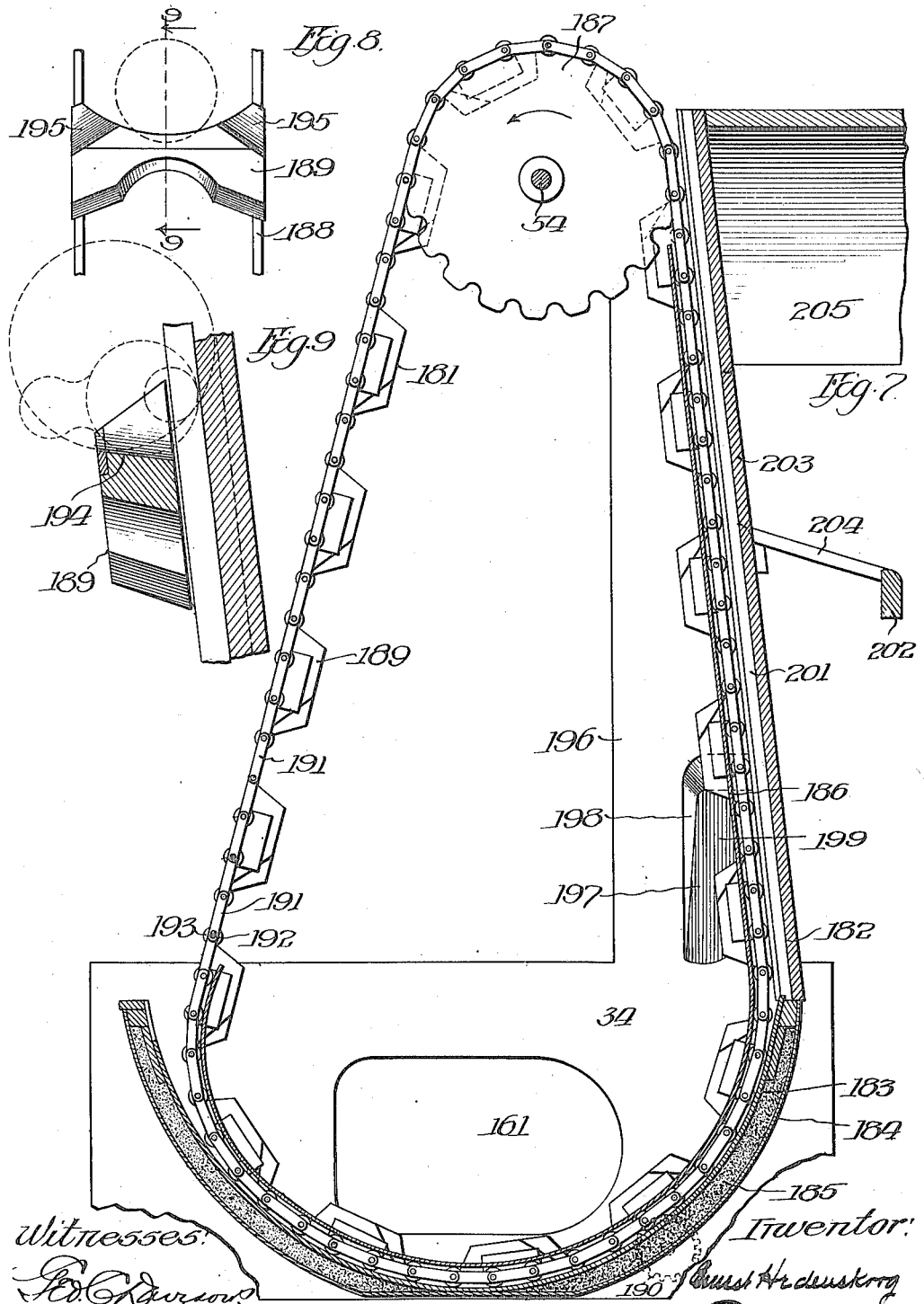

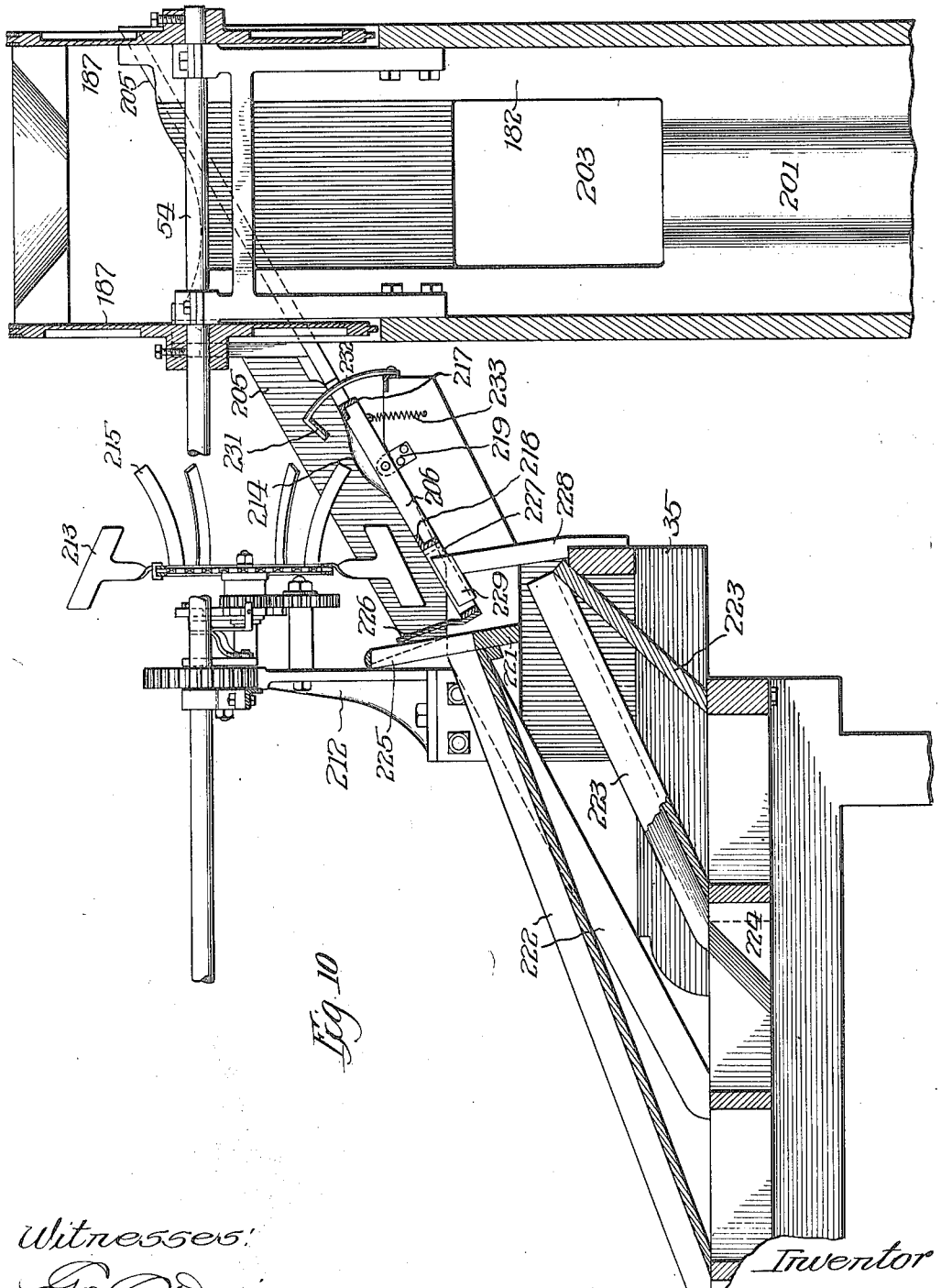

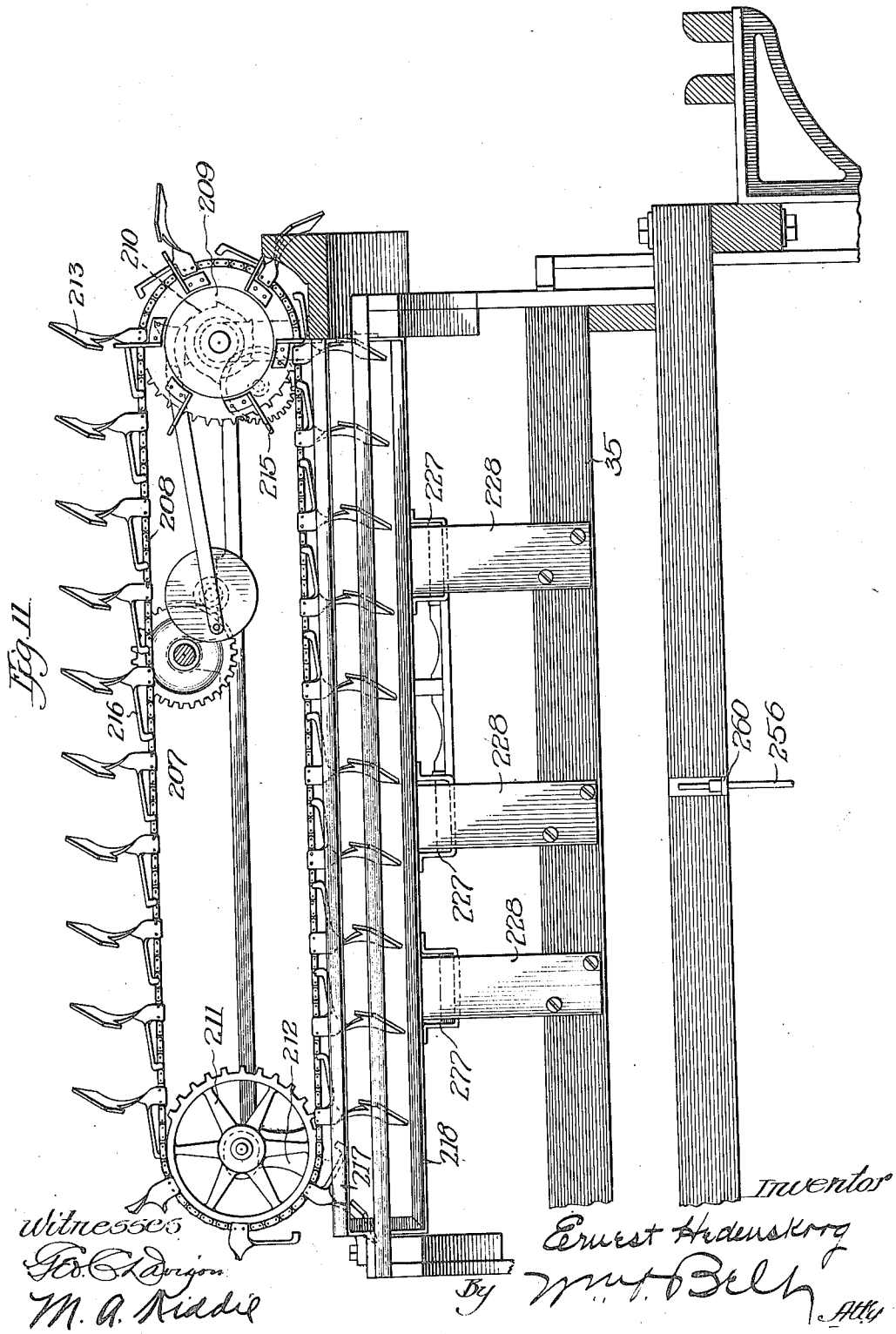

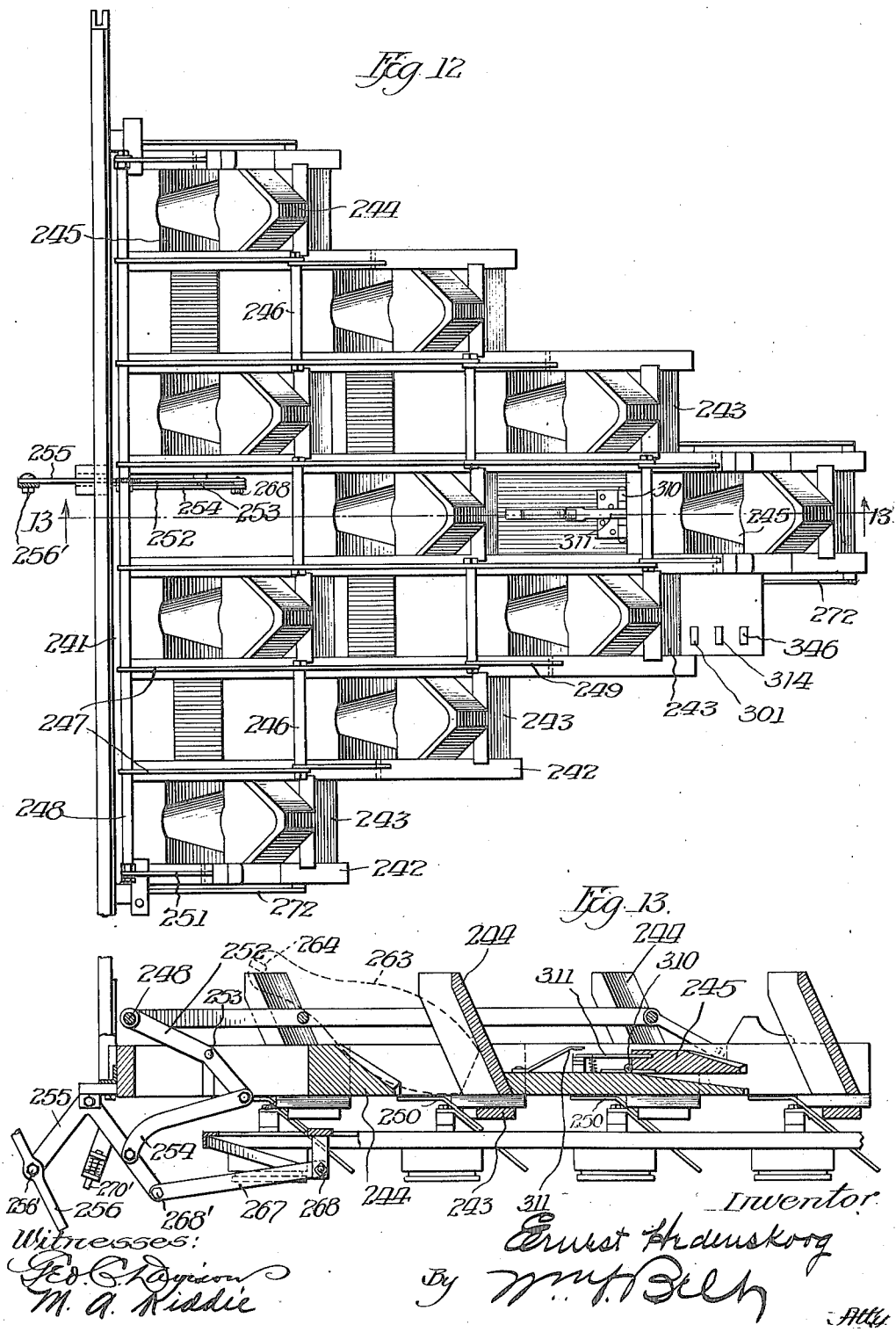

E. HEDENSKOOG.
AUTOMATIC PIN SETTING MACHINE.
APPLICATION FILED JUNE 6, 1914.
1,190,648.
Patented July 11, 1916.
12 SHEETS—SHEET 10.
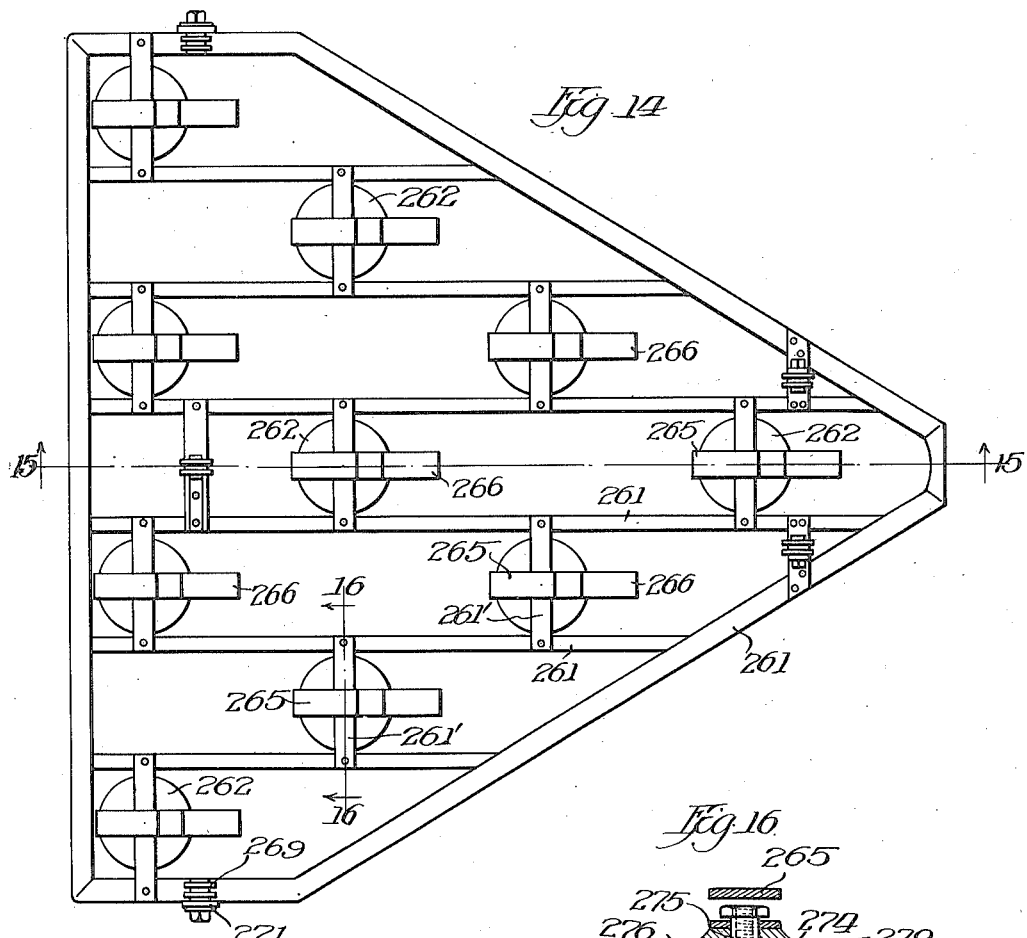
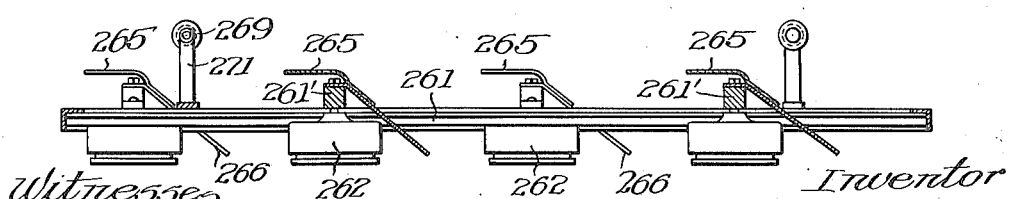

E. HEDENSKOOG.
AUTOMATIC PIN SETTING MACHINE.
APPLICATION FILED JUNE 6, 1914.
1,190,648.
Patented July 11, 1916.
12 SHEETS—SHEET 11.
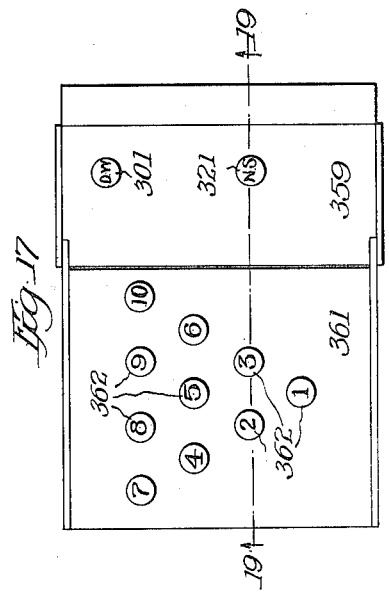
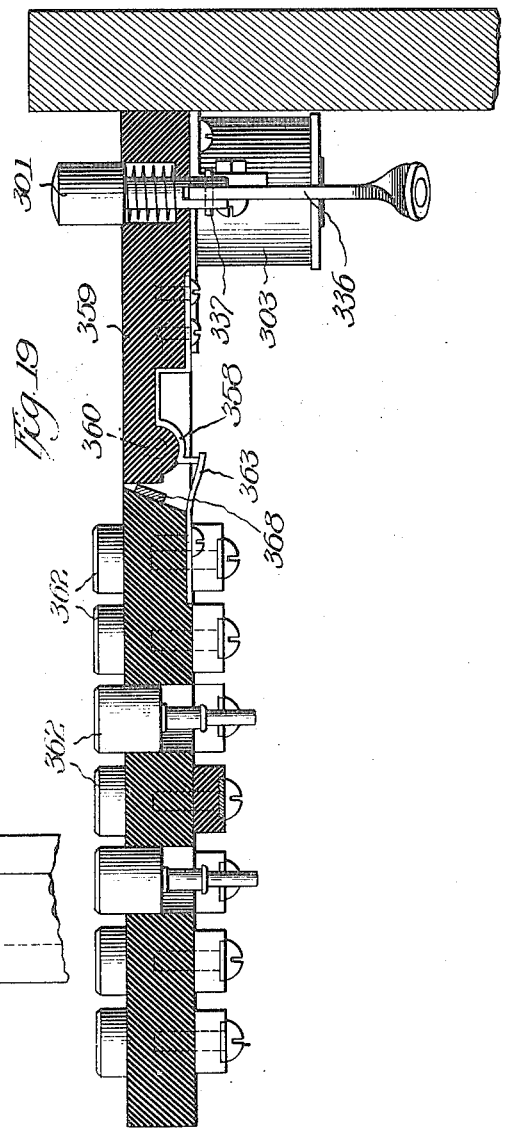
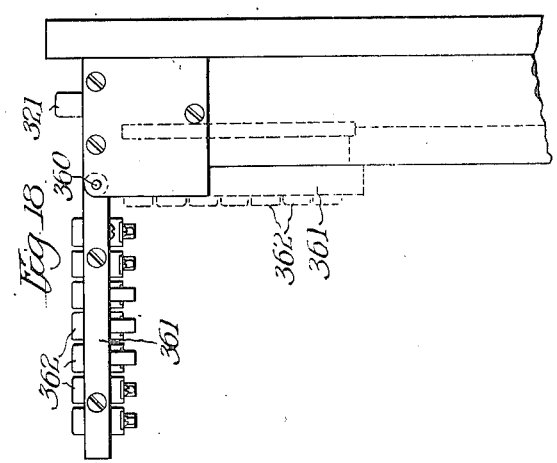
Witnesses:
Inventor:
Ernest Hedenskoog
By
Atty

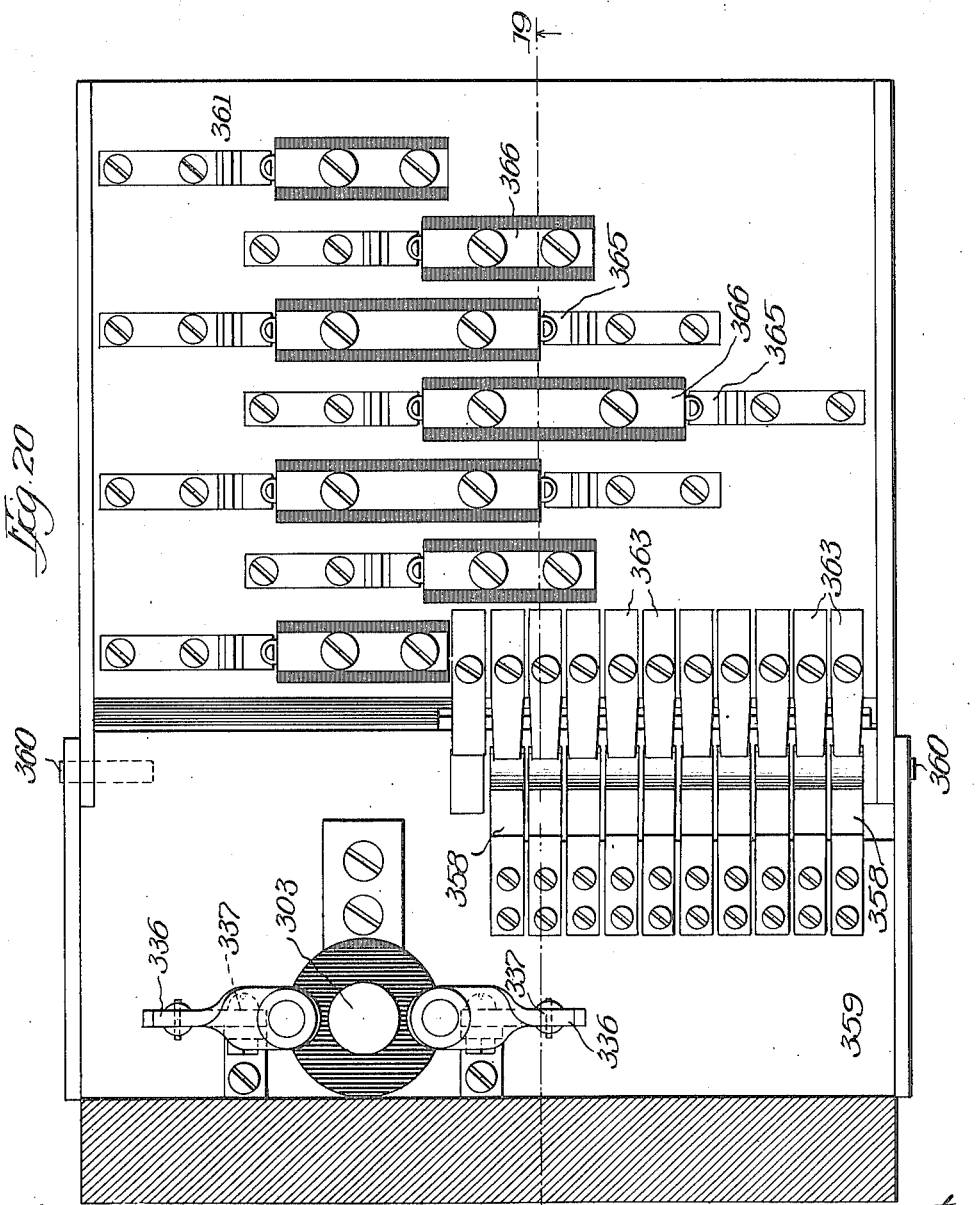

UNITED STATES PATENT OFFICE.

ERNEST HEDENSKOOG, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

AUTOMATIC PIN-SETTING MACHINE.

1,190,648.  Specification of Letters Patent.  Patented July 11, 1916.

Application filed June 6, 1914. Serial No. 843,372.

*To all whom it may concern:*

Be it known that I, ERNEST HEDENSKOOG, a citizen of the United States, residing at Muskegon, in the county of Muskegon and State of Michigan, have invented certain new and useful Improvements in Automatic Pin-Setting Machines, of which the following is a specification.

The object of the present invention broadly is to provide a machine to do all the work of a pin boy in setting pins upon a bowling alley, returning the ball to player's position and setting the pins in proper position upon the alley bed and which will perform each of these operations more quickly and more accurately than they have been performed by the pin boy.

The present invention has relation to the machine forming the subject-matter of my application filed February 13, 1914, Serial No. 818,449, and presents certain novel mechanisms and devices, and combinations and arrangements of parts which may be incorporated in such a machine.

The first ball rolled by the player may knock down all of the pins or it may only knock down some of them. If it knocks down all of the pins it is desirable, of course, to immediately place a new set upon the alley for the next player and if he knocks down less than all of them to remove those that have fallen in order to give the player an opportunity to roll a second ball at the pins left standing. A player, however, is likely to thoughtlessly cause a new set to be made after the first ball has been rolled and some pins left standing. In order that such a mistake may be readily corrected it is a further object of my present invention to provide mechanisms and devices under the control of the player which will permit the machine to automatically remove in the next operation after the mistake has occurred all of the pins that were knocked down by the player's first ball, thereby leaving standing the proper number of pins properly placed upon the alley for his second ball. Such mechanisms and devices permit also the player to practice rolling the balls at particular combinations of pins.

A still further object of the invention is the provision of means for automatically removing from the machine and from the alley all broken pins which, if left, might be set upon the alley or might clog or impair the efficiency of the machine.

Other objects and advantages of the invention will be apparent from the following description when considered in connection with the accompanying drawings, illustrating a preferred embodiment thereof.

On the drawings, Figure 1 is a side elevation of a pin setting machine for a bowling alley in which are incorporated novel and improved mechanisms and devices embodying my present invention; Fig. 2 is an enlarged side elevation of the mechanism provided to control and time the operation of the pin setter and sweeper; Fig. 3 is a top plan view of the same with a portion of certain parts removed as will later appear; Fig. 4 is a vertical section taken substantially on the line 4—4 of Fig. 3; Fig. 5 is a top plan view of the alley pit; Fig. 6 is a vertical section taken substantially on the line 6—6 of Fig. 5; Fig. 7 is an enlarged vertical sectional view taken substantially on the line 7—7 of Fig. 1 showing the elevating mechanism; Fig. 8 is a front elevation of one of the flights of the conveyer; Fig. 9 is an enlarged section taken substantially on the line 9—9 of Fig. 8; Fig. 10 is an enlarged partial longitudinal vertical section through the elevating, assembling and distributing mechanisms; Fig. 11 is a vertical transverse partial sectional view taken rearwardly of the assembly mechanism; Fig. 12 is an enlarged detail plan view of the pin setter frame; Fig. 13 is a vertical sectional view taken substantially on the line 13—13 of Fig. 12; Fig. 14 is a top plan view of the pin lifting magnet frame and the pin lifting magnets; Fig. 15 is a vertical section taken substantially on the line 15—15 of Fig. 14; Fig. 16 is an enlarged section through one of the magnets taken substantially on the line 16—16 of Fig. 14; Fig. 17 is a top plan view of the operating control located at the player's end of the alley; Fig. 18 is a side elevation of the same; Fig. 19 is an enlarged detail sectional view taken substantially on the line 19—19 of Fig. 17; Fig. 20 is an enlarged bottom plan view of the control shown in Fig. 17, and Fig. 21 is a diagrammatic view of the wiring provided for the various electrical circuits incidental to the control and operation of the machine.

A pin setting machine in which are incorporated the various mechanisms and devices forming the subject-matter of the present invention is shown set up at the pit end of a bowling alley. The alley comprises the usual bed 31, side walls or kick-backs 32, alley pit 33, and end wall 34. Upon the side walls or kick-backs a suitable main frame 35 is supported. A pin setter comprising a frame 36 and various other parts to be later described is mounted to move vertically in the main frame 35 and is normally retained in elevated position by chains 37, each fastened at one end in suitable fashion as by the hook 38 to the pin setter frame and passing over sprocket wheels 39, means being provided to actuate the sprocket wheels at appropriate times to raise and lower the pin setter frame. Any number of chains 37, of course, may be provided and at least one should be secured to the front end of the frame and at least one also to the rear end of the frame. Each rear chain is preferably trained over an idle sprocket wheel 41 disposed above the pin setter frame so that the point of suspension is directly above the fastening of this chain to the pin setter frame. The pin setter frame is guided in its movement by one or more angle irons 42 arranged vertically and each secured at its upper ends 43 and 44 to the main frame. A channel iron 45 secured at its lower end to the pin setter frame is arranged to embrace one of the flanges of the angle iron so that the angle iron acts as a guide when the pin setter frame is moved vertically.

The sprocket wheels 39 are fixed upon a shaft 47 journaled to turn freely in brackets 48 upon the top of the main frame 35. Upon this shaft a pinion 49 (Fig. 2) is fastened which imparts movement to the sprocket wheels in response to the pressing of a button at the player's end of the alley. A counterweight 51 is secured to the free ends of the chains 37 and reduces materially the power needed to raise and lower the frame as the machine is operated. The pinion 49 and all the relatively moving parts of the pin setting machine receive their power from a motor 52 secured to the main frame 35 at 53. This motor continuously drives a main power shaft 54 (Figs. 1 to 4) through a suitable train of gearing 55. The shaft 54 is journaled at its forward end in three arms 56 of a long bracket member 57 which is supported in horizontal position above the shelf 53 by the main power shaft at one side and a suitable support 57' (Fig. 1) at the other. The two outer arms 56 are spaced apart a sufficient distance to permit the various devices and mechanisms provided to control and time the operations of the pin setting machine to be positioned between them.

A sleeve 58 (Figs. 2 to 4) which for the purposes of the present invention may be considered a hollow shaft embraces the main power shaft and extends from adjacent one outer arm 56 (at the right in Fig. 3) to the other outer arm 56 (at the left in this figure). This sleeve is adapted to be locked to the main power shaft by a clutch 59 of any preferred construction. A cam or eccentric 61 (Fig. 4) carrying a band 62 is loosely mounted on the sleeve 58 and a bell-crank 63 (Fig. 2) having a long arm 64 and a short arm 65 is pivoted at 66 to a support 67 extending upwardly from the middle arm 56 of the bracket member 57 and directly above the bearing in this arm for the sleeve 58. The free end of the short arm 65 of the bell-crank is disposed substantially vertically above the band 62 and is connected thereto by links 68, so that as the cam or eccentric 61 turns with the sleeve 58, as will be later described, the bell-crank will oscillate vertically about its pivot 66.

The long arm of the bell-crank is provided with an elongated slot 69 (Fig. 2) to which a driving rod 71 for the pinion 49 is connected by a pin 72. The driving rod extends outwardly over the pinion 49 and is provided along its lower surface with a rack 73 adapted to engage with the teeth of the pinion to rotate the pinion as the bell-crank 63 is moved by the eccentric.

The pin setting machine embodying my invention performs two separate main operations, one setting the pins in proper position upon the alley bed and the other removing the deadwood after the first ball has been rolled along the alley. In the first operation the pin setter frame is lowered to just above the alley bed and from this position deposits the pins accurately upon the spots. In removing the pins the frame is lowered only to the height of the standing pins which it lifts above the alley while the pins which have fallen upon the alley bed are swept in the alley pit, after which operation the pin setter returns and replaces the standing pins. The travel of the frame is, therefore, different in the two operations and this difference of travel is attained in accordance with my present invention by varying the distance of the point of connection of the driving rod 71 with the long arm 64 of the bell-crank from the pivotal axis of the bell-crank. In Fig. 2 the pin which connects the bell-crank and driving rod is located at the lower end of the slot, i. e., the end of the slot nearest the pivotal connection of the bell-crank which is its position throughout the deadwood operation. The eccentric 61 is normally locked to the sleeve 58 and during the removal of deadwood moves constantly therewith. When it is desired to make a new set the rod 71 is lifted, as will be later explained, until the pin 72 engages the upper end of the slot 69 where it is locked in position by a hook 74 provided upon the end of a lever 75 pivoted at 76 to the long arm of the bell crank and provided at its lower end with a stop 77 adapted to engage a yielding stop 78 secured upon an arm 79 provided upon the support 67, the engagement of these two stops serving to retain the hook 74 in the inoperative position shown in Fig. 2. A spring 81 engaged at one end to the long arm of the bell-crank and at the other to the lever 75 moves the lever upon movement of the bell-crank from the normal position shown to pull the hook across the slot and retain the pin 72 at the upper end of the slot after the driving rod has been lifted preparatory to the making of a new set. The lower end of the lever 75 is provided with a second hook 82 adapted to be projected across the lower end of the slot 69 to engage the pin 72 during the operation of the machine in removing deadwood.

After the standing pins are lifted in removing the deadwood and before the operation of the pin setter frame in placing a new set of pins upon the alley, the alley is cleared by a sweeper which will now be described. This sweeper consists in the present instance of a sweeper blade 84 (Fig. 1) pivotally suspended at 85 from a sweeper-carrying frame 86. This frame is provided at its lower end with a plate 87 extending transversely of the alley against which the blade 84 rests during the active part of its stroke or the movement carrying it normally across the alley bed to sweep the pins into the alley pit. Upon this plate 87 a pair of angularly extending braces 88 are provided. Each of these braces is pivotally connected at its end 89 distant from the plate 87 to a rigid link 91 which is pivotally connected to the main frame at 92. A shaft 93 is mounted in suitable bearings in the main frame to extend transversely thereof and upon this shaft is secured an outwardly extending arm 94 pivotally connected at its outer end 95 with each brace 88, said arms 94 being connected with the braces at a point inwardly of the point of the pivotal connection between the link 91 and the end 88 of this brace. The shaft 93 is supported rearwardly of and at a greater height above the alley than the pivotal connections between the links 91 and the main frame. Rotation of the shaft 93 in a counter-clock wise direction, viewing Fig. 1, will, therefore, move the sweeper downwardly toward and rearwardly over the alley with the sweeper blade 84 sufficiently near the alley to sweep all of the pins into the pit. The plate 87 is disposed during this movement at a height above the alley floor greater than the diameter of the balls used in playing upon the alley so that if the ball is rolled along the alley during the operation of the sweeper it will only engage the sweeper blade 84 and lift the same out of its way. Secured also to the shaft 93 is an outwardly extending arm 97 to the outer end of which is connected a spring 98 fastened at 99 to the main frame to counterbalance in part the weight of the sweeper and reduce the force necessary to its efficient operation.

The mechanism for operating the sweeper consists of a cam or eccentric 101 (Figs. 1, 2 and 3) mounted loosely upon the sleeve 58 and provided with a band 102 to one end of which is pivoted a driving rod 103. The driving rod 103 extends vertically downwardly alongside the shaft 93 and is provided upon its lower end with a rack 104 meshing with a gear 105 fixed upon the shaft 93, so that vertical reciprocation of the rod 103 imparts an oscillatory movement to the shaft 93 and actuates the sweeper moving it first rearwardly across the alley bed and then back again to normal position.

The operation of the sweeper and pin setter are controlled and timed by a mechanism which will now be described. This mechanism consists of a device for throwing in the main clutch 59 to operatively connect the sleeve 58 with the shaft 54 during two complete revolutions and means for rendering the eccentrics 62 and 101 inoperative throughout appropriate intervals. When a new set is to be made it is desirable that as soon as the sweeper has finished its rearward or sweeping movement along the alley the pin setter frame should start downwardly to deposit the set of pins upon the alley. The timing mechanism to be now described causes the eccentric 101 to rotate with the sleeve 58 as soon as the sleeve 58 is locked to the shaft 54. The first half revolution of the shaft and sleeve moves the sweeper along the alley bed to clear the alley at the end of which time the eccentric 62 is engaged with the sleeve and the pin setter frame started downwardly to deposit a new set of pins. At the completion of the first whole revolution of the sleeve 58 the sweeper has returned to normal position and the eccentric 101 is unlocked from the sleeve 58 and the pin setter frame is in lower position and is ready to deposit a new set of pins upon the alley bed. The frame returns empty and arrives at its upper or normal position at the completion of the first half of the second revolution of the shaft and at this point its eccentric 62 is released and the operation is completed.

In the operation of clearing deadwood the pin setter frame precedes the sweeper in operation and during the first half revolution the sweeper-directing cam or eccentric is unlocked from the sleeve 58. At the end of this first half revolution the pin setter frame has descended to the tops of the standing pins and the sweeper-directing cam or eccentric 101 is locked to the sleeve 58. During the second half of the first revolution the pin setter frame returns to elevated or normal position carrying the standing pins and the sweeper moves rearwardly along the alley bed to clear off the fallen ones. During the first half of the second revolution the sweeper returns to normal position and the pin setter frame approaches the alley to replace the pins it has lifted preparatory to the action of the sweeper. At the end of this half revolution the sweeper-directing eccentric 101 is unlocked from the sleeve 58 and the sweeper remains idle throughout the last half revolution during which the pin setter frame returns to its normal position after having replaced the standing pins. The sleeve 58 is caused to make two revolutions with the shaft 54 at each operation of the machine by a disk 106 mounted rigidly upon a gear 107 (Figs. 3, 4) loosely mounted upon a stub shaft 108 journaled in the middle arm 56 of the bracket member 57. The gear 107 is in mesh with a pinion 109 splined upon the sleeve 58, the ratio of the number of teeth in the pinion 109 to the number of teeth in the gear 107 being 1 to 2, so that the pinion will make two complete revolutions to one revolution of the gear. In the cylindrical face of the disk a recess 111 is provided in which a roller 112 carried upon the end of the free arm of the main clutch lever 113 rests while the clutch is thrown out. When the lever is moved to throw in the clutch the roller is withdrawn from the recess and the initial rotation of the sleeve 58 with the shaft moves the recess out of position to receive the roller, so that the roller must ride upon the outer surface of the disk throughout a complete revolution of the gear 107 at which time the recess will again be in a position to receive the roller. While the roller is riding upon the outer face of the disk the clutch is positively held in engagement and a spring 110 secured at 114 to one end of the lever 113 and at the other end at 115 to the central arm 56 of the bracket member 57 pulls the lever about its pivot 116 to throw out the clutch at this point.

A magnet 117 is mounted adjacent the end of the lever 113 carrying the roller 112 and this end of the lever is provided with an armature 117' adapted to be attracted by the magnet when the magnet is energized, so that energization of this magnet will throw in the clutch and move the roller and thereby cause the sleeve 58 to make two revolutions with the shaft in the manner hereinbefore described.

Both eccentrics 62 and 101 are normally locked to the sleeve 58 by devices which will now be described. Each eccentric is provided with a hub 120 within which is positioned a collar 118 (Fig. 2). This collar is tight upon the sleeve. Through this collar and through the sleeve are disposed a pair of diametrically arranged recesses 119, and an aperture 121 is provided in each hub 120 which is adapted to aline at appropriate intervals with the apertures 119. Slidably mounted in each of the apertures 121 and normally extending into an aperture 119 alining therewith is a pin 122. Each pin 122 has an enlarged soft iron head forming an armature 123 for an unlocking magnet to be later described and is slidably carried by an arm 124 rigidly mounted at 125 on the eccentric. A helical spring 126 embraces each pin and is positioned between the arm 124 and a stop 127 secured upon the pin. The spring 126 normally pushes the pin 122 inwardly of the sleeve 58 and the shaft 54 so that each pin 122 is normally held in engagement in appropriate recesses 119 and 121 to lock the eccentrics to the sleeve.

The setter eccentric 61 is adapted to be unlocked by a magnet 128 mounted upon a platform or shelf 35' secured in the main frame 35 in position to attract the armature 123 of the pin controlling this eccentric when the parts are to be arranged for the new-set operation and a similar magnet 129 similarly mounted is provided to attract the armature 123 of the pin normally locking the sweeper-directing eccentric 101 to the sleeve 58 when the deadwood is to be removed. The magnet 128 is energized when the machine is started for the making of a new set, the withdrawal of the pin 122 carrying its armature serving to unlock the setter-directing eccentric until the diametrically opposed recess 119 is in position to receive the pin long before which time the magnet 128 has been deënergized. This diametrically arranged aperture 119 is positioned for the engagement by the pin 122 at the end of the first half revolution of the shaft. A similar operation occurs with the eccentric 101 in the removal of deadwood, the energization of the magnet 129 serving to delay the operation of the sweeper throughout the first half revolution of the shaft in this operation.

The eccentrics 61 and 101 are unlocked from the shaft by mechanical means during the remainder of the operations at proper intervals. The mechanism for accomplishing this purpose will only be briefly described in the present application as it is substantially the same as the mechanism provided for this purpose in my earlier application Serial No. 818,449. This mechanism consists primarily of a pair of gears 131 mounted upon a stub shaft 132 and positioned between the eccentrics 61 and 101. The gears 131 mesh with gear teeth 133 provided in the sleeve 58, the number of teeth in the sleeve being to the number of teeth on the gears as 1 to 2, so that the gears receive one revolution to two of the sleeve. Each of the gears carries a disk 134 which is provided with suitable cams for engaging the upper surfaces of the armature 123 at appropriate intervals. This engagement can only be accomplished when the armatures and eccentrics are in normal position as at other times the armatures move with the eccentrics about the shaft as a center while the gears rotate about the shaft 132. It may be stated that the disk adapted to move the pin 122 of the eccentric 61 is provided with a single outwardly extending portion which reaches its lowermost point during the travel of the disk at the termination of the third half revolution of the sleeve 58. Such an arrangement maintains the disk inoperative during the removal of deadwood by reason of the fact that at the end of the third half revolution in this operation the armature is disposed vertically above the sleeve and shaft and the pin setter frame is replacing the standing pins. In the making of a new set, however, this portion engages the armature to render the pin setter frame idle during the last half revolution of the pin setting machine for in the operation of making a new set the armature of the pin setter control is in normal position at the end of the third half revolution and the pin setter frame has performed its duties and the pin may be removed from the recess 119 in which it is engaged.

The disk which controls the operation of the sweeper-directing eccentric after the first half revolution of the sleeve is provided with two outwardly extending portions, one adapted to be in lowermost position at the end of the first revolution and the other at the end of the first half of the second revolution. In making a new set the sweeper must be disconnected at the end of the first whole revolution at which time the armature controlling it is in normal position after having swept the alley. After being disengaged at this point its locking pin must be prevented from entering the diametrically opposed recess 119 which presents itself at the end of the first half of the second revolution. This is accomplished by the other outwardly extending portion which at this instant is in position to engage the armature 123 of this pin. In removing deadwood the armature controlling the sweeper-directing eccentric is vertically above the shaft and sleeve at the end of the first complete revolution so that the outwardly extending cam presented at this point in the operation is ineffective and the sweeper is disconnected at the end of the first half of the second revolution by the other outwardly extending portion as it comes into position.

The magnet 117 actuating the main clutch 59 and the setter and sweeper magnets 128 and 129 are connected to push-buttons or switches located adjacent player's position by suitable circuits to be later described and it is intended that the new-set operation, or the removal of deadwood operation will be accomplished by momentarily closing the proper circuit at the buttons or switches, the only electric control necessary to the proper operation of the machine consisting in delaying throughout the first half revolution of the sleeve one or the other of the eccentrics 61 and 101, depending upon which operation is desired after which the action is automatically and mechanically controlled.

In the removal of deadwood the pin setter frame operates substantially continuously, the movement of the sweeper rearwardly over the alley bed to sweep it clear of pins occurring while the pin setter is traveling up to normal position with the standing pins and the movement returning it to normal position occurring when the pin setter frame is moving downwardly to replace them, and in the making of a new set the movements of the sweeper and setter occupy only three one-half revolutions of the shaft and move simultaneously during the middle half of the three. As has already been described the driving rod 71 of the pin setter frame is normally engaged in the lower end of the slot 69 of the bell-crank lever 63. This is its position during the removal of deadwood. When, however, a new set is to be made and the longer travel of the frame is required the end of the driving rod carrying the pin 72 is raised by the first action of the control for the sweeper which, as has been stated, precedes in action the pin setter frame and its control. This is accomplished by a rod 141 mounted to reciprocate vertically in a bearing 142 provided on an outer arm 56 of the bracket member 57. The lower end 143 of this rod is connected by a pin 144 to the sweeper driving rod 103 and its upper end is flattened to provide a shoe 145 adapted to engage beneath a pin 146 carried by the pin setter driving rod 71. The sweeper-directing cam causes the driving rod 103 of the sweeper to move upwardly during the first half revolution of the sleeve and this driving rod, therefore, imparts an upward vertical movement to the rod 141. Inasmuch as the bellcrank 63 is idle and in normal position during this half revolution the hooks 74 and 82 are inoperative and the pin 72 slides readily to the upper end of the slot 69. At the end of the first half revolution the bellcrank starts its movement toward the left (viewing the figure) and the hook 74 engages under the pin and retains the driving rod in engagement with the upper end of the slot 69 where it is retained until the bellcrank and pin setter frame are again in normal position.

As has already been described, the spring 81 normally holds the lever 75 with the two hooks 74 and 82 across the slot 69. In order that the rod 141 may lift the sweeper driving rod 71 from the lower position to the upper, should any loose movement of the bell-crank prevent engagement between the stops 77 and 78, I provide a movable stop 147 pivoted upon the angle iron 79 intermediate its ends at 150 and pivoted at one end to one end of a link 148. The other end of the link 148 is pivoted to the shoe 145 of the rod 141 at 149. The upward movement of the rod 141 will cause the stop 147 to engage the pin 77 on the lever 75 and move it out of the path of travel of the pin 72 which connects the driving rod 71 with the bell-crank. This permits the easy release of the pin 72 even when the bell-crank is not in accurate normal position and prevents the machine from becoming inoperative should the bell-crank become so loosely connected to the support 67 that the pin 77 does not engage the stop 78 on the arm 79. The stop 78 may be omitted, if desired, and the movable stop 147 relied upon to shift the lever 75 carrying the hooks. The upper hook 74 is preferably cut away at 151 to permit the pin 72 to move it out of its way as it approaches the upper end of the slot if this hook should be projected across the slot at this time.

The driving rods 71 and 103 of the pin setter and of the sweeper are positively held in engagement with the pinions which they actuate. The driving rod 71 is held against the pinion 49 by a saddle 152 bearing upon the upper surface of the driving rod and having side members 153 loosely journaled on the shaft 47. A spring 154 fastened at one end to the saddle and at the other to the main frame pulls the saddle toward the left (viewing Fig. 2) and causes the saddle thereby to move the driving rod 71 back to normal position when the hook 74 is released after performing a new-set operation. The driving rod 103 is held against the pinion 105 (Fig. 1) by a cross member 155 of the main frame.

The pins are conducted from the alley pit to the setter frame and the balls are returned to player's position by the continuously operating mechanisms which will now be described. The alley pit 33 is constructed to deliver the pins and balls through an aperture 161 (Fig. 1) in the rear wall 34 of the pit. In the center of the pit 33 (Figs. 1, 5 and 6) a plurality of vertically disposed stationary ribs 162, extending longitudinally of the alley and spaced well apart, are provided. A number of movable members 163 are placed between these ribs so that the ribs and movable members alternate. The movable members are supported from two shafts 164 disposed through their ends. The shafts 164 are journaled in suitable bearings 164' and extend through the ribs and through the movable members. Each shaft carries a cam 165 for each movable member, said cams being arranged to lift the members bodily, vertically and in unison, bringing them up above the tops of the ribs 162 adjacent the front of the alley and carrying them back toward the rear of the alley and down beneath the top surface of the stationary ribs. This lifts the pins as they fall in the pit and carries them rearwardly toward the aperture 161 a step at each revolution of the shafts 164. The shafts 164 rotate together by a chain gearing or drive 166 and they receive their power from a continuously moving conveyer, which will be later described, through the shaft 169 driven by the conveyer and mounted in bearings 171. The shaft 169 has a beveled gear 172 meshing with a pinion gear 173 on one of the shafts 164.

At each side of the mechanism just described the pit is provided with an inclined wall or base portion 167 extending from the outer movable members upwardly to adjacent the side walls or kick-backs 32, so that the pins and walls will be deflected down onto this mechanism. It is one of the functions of the mechanism located in the bottom of the pit to deliver the balls through the aperture 161 in the rear wall of the pit ahead of the pins, so that the balls may be quickly returned to player's position. As will be later apparent the pins in the present embodiment of my invention need not be rapidly carried across the pit by reason of their expeditious handling after they are delivered out of the pit and until they are received by the pin setter frame. The pit bottom just described will permit the balls to roll across without any obstruction to their passage by pins which may have fallen ahead of them into the alley pit. Balls are much heavier and are ordinarily traveling at appreciable momentum. These pins are readily moved out of their way by the balls and the balls pass through the aperture ahead of the pins. The movable members and the ribs are preferably provided with suitable strips 168 on their top faces to reduce the noise which is incidental to the operation of the device and to save in part, at least, the pins and balls from injury.

After being delivered out of the alley pit the balls are lifted to the return track and the pins to other mechanisms above the setter frame by an elevating mechanism which comprises a continuously moving conveyer 181 which passes beneath the aperture 161 and travels in a vertical plane as will be seen from Fig. 7. A conveyer casing 182 is located rearwardly of the back wall 34 of the alley pit and is semi-circular in form at its bottom and extends upwardly at the forward side of travel (the right in Fig. 7) of the conveyer. The bottom semi-circular portion of this casing consists in the present instance of an inner shell 183 and an outer shell 184. These shells are preferably of sheet metal and are spaced apart an appreciable distance to permit the insertion of a silencing packing 185 of any preferred material. The conveyer during the upper portion of its travel is guided against the adjacent surface of the conveyer casing by a pair of guides 186, preferably also of metal. The conveyer receives its movement from sprocket wheels 187 mounted upon the main power shaft 54. The conveyer consists of a pair of side chains 188 and a plurality of flights 189 for carrying balls and pins. Each side chain consists of a plurality of links 191 pivotally connected together by pins 192, each of which pins carries a roller 193 adapted to roll between the guides 186 and the casing wall. The links 191 and the pins 192 are arranged to provide a sprocket chain at each side of the conveyer adapted to engage the teeth of the sprocket wheel 187 to impart movement to the conveyer. The shaft 169 which actuates the movable members in the bottom of the pit is provided with a sprocket wheel 190 which engages one of the conveyer chains so that the continuous movement of the conveyer imparts a continuous movement to the shaft 169 and consequently to the movable members 163 in the bottom of the pit. The flights 189 are mounted at appropriate intervals between these chains and are supported from the chains by two adjacent pivot pins 192 of each conveyer chain. The width of the conveyer is preferably equal substantially to the length of a pin, so that when a pin rests upon a flight its ends will be adjacent the side walls of the casing. Each of these flights consists of a single member, the top surface 194 of which is curved from end to end and slopes toward the casing wall 182 extending upwardly alongside the forward travel of the conveyer. The upper portion of the flight slopes rearwardly from the forward edge of this curved surface and is cut away toward the outer edges to provide a rest 195 for the head of the pin which may lie upon the flight in one of two positions, i. e. with the head extending toward the player or with the head extending away from him.

In order that the pins may be accurately positioned upon the flight I provide in each side wall 196 of the casing which is extended upwardly alongside the wall 182 an aperture 197 cut completely through this wall, the inner and upper bounding surfaces 198 of which are inclined as shown in Fig. 7. A metallic plate 199 is secured on the outside of each side wall 196 and closes the aperture 197. If a pin then is caught by the flight with its head bearing against one of the side walls of the casing this head end will fall into the aperture 197 when the flight reaches this point in the travel. As the flight approaches the upper end of the aperture the head end will engage the inclined faces 198 and will be slid back into accurate position upon the flight. As the apertures 197 are located adjacent the bottom of the upper travel of the conveyer this arrangement prevents pins in large measure from falling back off the flights into the bottom portion of the casing and thereby materially speeds up the action of the machine, as the pin having once been caught by the flight is carried immediately upwardly by the conveyer.

The upward travel of the conveyer and the wall 182 is inclined somewhat from the vertical so that the pins and balls carried by the conveyer move upwardly in contact with this wall. A recess 201 (Figs. 7, 10) extends longitudinally and centrally of the conveyer to above the vertical height of the ball return track 202. An aperture 203 is provided in the wall 182 above the return track to permit the balls to leave the conveyer at this point, when they fall upon a plurality of inclined slats 204 down which they roll to the return track. These slats are spaced apart a sufficient distance to permit any broken pins to fall between them. The aperture 203 is too narrow to permit the pin to pass through as the conveyer carries it upwardly, but a broken pin having materially less dimension than the whole or perfect pins may readily pass through with the balls and be delivered outside of the machine. As the conveyer moves upwardly the pins carried upon the flights extend across the aperture 203 and engage the casing at their butt ends, the head ends lying over upon a head-rest 195.

The pins are delivered by the conveyer 181 to a chute 205, the upper end of which is disposed beneath the upper edge of the wall 182. As each flight reaches this point the pins fall over the top edge of the wall and into the chute from which they are assembled by an assembling mechanism to be later described. The pins are caused to enter the chute butt end foremost, the head end of the pin being retarded by the head rest 195 until the butt end has left the flight after which it slides off and the pin moves down the chute. It will be noted from Fig. 10 that the upper edge of the wall 182 is lower at the left (viewing the figure) than at the right. This is to reduce the drop of the pin into the chute and thereby minimize the noise incidental to the transfer of the pins from the conveyer into the chute. The pins are moved from the bottom of the chute 205 onto an assembly shelf 206 by a conveyer 207.

The conveyer in the present instance consists of a chain 208 trained over a pair of sprocket wheels 209, 211 located one on each side of the pin setting machine in suitable bearing brackets 212. A plurality of conveyer blades 213 are secured to the chain and extend outwardly therefrom. The blades are spaced to arrange ten of them on the lower travel of the conveyer. As each pin reaches the bottom of the shelf the conveyer 207 is actuated and advanced one step by a device similar to that described in my prior application, Serial No. 818,449, which, as it forms no part of the present invention, is only shown generally on the drawings at 210. It may be stated, however, that this mechanism is actuated by the pin itself upon arriving at the bottom of the chute through various members which temporarily connect the conveyer with a continually moving device. Each time the conveyer is advanced it carries the pin which has caused the actuation thereof off of the chute and onto the assembly shelf 206 and carries also each pin already resting on the shelf forward a like distance. In the present instance the chute is provided adjacent its bottom with a raised portion 214 upon which the head of the pin rests until it has moved onto the shelf.

Extending outwardly from the sprocket wheel 209, which is the sprocket wheel adjacent the chute, are a plurality (six in the present instance) of curved blades 215 adapted to engage behind the neck of the pin to cause the pin to be moved bodily and quickly off the shelf. These blades are mounted so that one of them is presented with each conveyer blade 213, so that when the conveyer blade engages the bottom portion of the pin and the corresponding sprocket blade 215 engages the head the pin is moved in substantial parallelism to itself onto the assembly shelf. The blades are preferably inclined so as to somewhat lift the pin from the bottom of the chute as it carries it forward and prevent it catching on the abutments which are provided to hold the pins on the assembly shelf. Each blade forms a link in the conveyer chain 208 and is provided with a rearwardly extending reinforce 216 adapted to enter into a link located rearwardly a substantial distance from the blade to stiffen it in its operation. This reinforce may be lifted out of engagement with the chain when the portion of the chain carrying its blade moves around a sprocket wheel, as is seen in Fig. 11.

The assembly shelf in the present instance consists of a rectangular frame of angle irons having front and rear longitudinal members 218, 217. The shelf is pivoted at its ends at 219 in the main frame of the machine and is normally disposed in the inclined position shown in Fig. 10. The forward side of the frame is disposed at a substantial distance from an upwardly extending abutment 221 against which the butt ends of certain pins, as will be later described, rest when in position on the shelf. The shelf is retained in normal position until a full set of ten pins have been collected thereon at which time it is automatically permitted to drop to deposit the pins in chutes 222 and 223 which carry the pins to a stationary distributing frame 224 mounted directly above the pin setter frame 36. This may be accomplished by any preferred automatic mechanism, although that described in my earlier application, already mentioned, is thought to be preferable.

The distributing frame 224 is mounted closely beneath the assembly shelf and in order that all of the pins may be delivered quickly from the assembly shelf to the distributing frame I prefer to deliver the pins to be set up in the first two rows and which are consequently located in the distributing frame adjacent its forward end, or the end remote from the assembly shelf, at a higher level than those to be set up in the last two rows. To this end the abutment 221 is cut away to provide an aperture 225 opposite the normal position of each of the pins to be set up in these rows. When the assembly shelf is in normal position this aperture is closed by a plate 226 secured upon the assembly shelf by a bracket 227 so that the plate covers the aperture 225 and prevents a pin sliding therethrough when the shelf is in normal position. The bracket 227 is hollow and extending centrally upwardly therethrough is a rigid support 228 adapted to engage beneath the pin when the shelf is lowered and retain it in normal position until the plate 226 has passed downwardly out of the way. In the present instance the support 228 consists of a member fastened on the main frame 35 and extending upwardly into the bracket 227 where it has an enlarged head 229 adapted to effectively support the pin. Downward movement of the shelf is limited by a cushion stop 231 carried by an arm 232 secured to the main frame, the stop 231 being in position to accurately stop the pivotal movement of the shelf when it is in position to deliver pins to the rear set of chutes 223. The shelf is returned to normal position by a spring 233 secured at one end to the shelf and at the other end to the main frame 35.

The pins are arranged in the distributing frame substantially in the triangular arrangement in which they are to be placed upon the alley bed. In the operation of the machine the pin setter frame may contain ten pins, the distributing frame ten more and the shelf may accommodate nine others before actuation. Through appropriate mechanisms and devices the pins in the distributing frame are received automatically by the pin setter frame after the pin setter frame has deposited a set of pins upon the alley bed and returned to normal position. The first pin of this set to arrive at the bottom of the chute 205 completes the set of pins on the assembly shelf and immediately the trip mechanism permitting the release of this shelf is actuated and the set thus completed is delivered to the distributing frame. The other nine pins of the first set placed upon the alley bed are delivered singly to the assembly shelf as they are knocked from the alley, either by balls or by the sweeper and are collected upon the assembly shelf to await the first pin of the next succeeding set. Should one or more of the pins become broken the operation of the machine is unhampered as in that event two or more pins must arrived at the shelf before a set may be completed on the shelf. This may or may not slow the operation of the machine depending upon the number of pins removed. The machine will stand the removal of any appreciable number of pins before any difference in its operation is observable by reason of the fact that a full set of pins is normally waiting in the distributing frame after the pin setter frame deposits the set of pins that it carries. The automatic delivery of the pins from the distributing frame is accomplished by any preferred mechanism but three conditions must be fulfilled before the action of the automatic mechanism should be permitted, i. e. there should be pins in the distributing frame, there should be no pins in the pin setter frame, and the pin setter frame should be in upper position. When these conditions are fulfilled the pins are automatically delivered to the pin setter frame from the distributing frame.

The pin setter frame consists of a back member 241 (Figs. 12, 13) and longitudinally extending members 242 secured at one end to the back member and to each other by cross members 243, the members 242 varying in length from the outer members to the central ones to provide for the arrangement of the pins in accordance with the spots upon the alley bed. Stationary guides 244 are mounted between the pairs of longitudinal members 242 in number equal to the number of pins in a set and arranged in accordance with the arrangement of the spots on the alley bed. Each of these stationary guides consists of an inclined upwardly extending angular member against which the base of the pin engages when the pin is in reclining position in the pin setter frame, as will be seen in viewing 13. These guides serve to direct the pins in proper position upon the alley bed, as will be later described. As the pins lie rearwardly of each guide a pin rest or support 245 is provided. The pins recline in the frame and are supported partially by the pin rests 245 and partially by movable combination guides and supports 250 which are normally disposed directly above the spots upon the alley bed. Extending transversely of each of the pin rests for the pins to be set up in the first three rows is a rod 246. This rod is arranged rearwardly and above the pin rests and the neck of the pin rests upon it when the pin is reclining in the frame. The rods 246 are pivotally connected at their ends to a plurality of plates or bars 247 which extend longitudinally of the frame and above the longitudinal members 242 of the frame. The necks of the pins to be set up in the last row rest upon a rod 248 which extends clear across the pin setter frame and which is also connected to the bars 247 so that the rod 248, rods 246 and bars 247 form a single unit. At the forward end of each bar 247 a link 249 is provided which pivotally connect these ends of the bars with the pin setter frame and similar links 251 connect the ends of the bar 248 with the pin setter frame.

A device is provided which will now be described for automatically lifting the unit constituted of the rods 246, 248 and bars 247 forwardly about the pivotal connection of the links 249 and 251 with the pin setter frame, lifting the pins carried thereon as they are deposited upon the alley bed. This mechanism consists of an elevating lever 252 fulcrumed in the pin setter frame at 253 and pivotally connected at one end to the rod 248 and at the other to a link 254. The link 254 is connected at its other end to one arm of the bell-crank 255 pivotally mounted beneath and at the rear of the pin setter frame as may be seen in Fig. 13. The other arm of this bell-crank is pivotally connected to a rod 256 at 256'. This rod extends upwardly above the pin setter frame through a slotted ear 260 fastened upon a stationary part of the machine. Upon the rod 256 are two stops 260' spaced well apart and located one on each side of the ear 260. When the pin setter frame is lowered this rod slides freely in the ear until the upper stop 260' engages the plate making further downward movement of the rod 256 impossible. This pulls the bell-crank lever toward the left, viewing Fig. 13, and causes a forward and upward movement of the rods 246 and 248. A recess 270 may, if desired, be provided in a side of the rod 256 to engage the slotted ear and prevent any play in the rod 256 when the upper stop 260' engages the ear 260. In order that the ear 260 may be disengaged from the recess 270 at the lowermost point in the travel of the pin setter frame I provide a spring-pressed plunger 270' carried by the bell-crank in position to engage the end of the rod 256 when the pin setter frame is in lowermost position. As the pin setter frame nears the bottom of its travel the bell-crank is moved toward the left, viewing Fig. 13, moving through an arc greater than that of the end of the rod 256. The plunger 270′ is disposed in position to press upon the lower end of the rod 256 at this point and disengage the ear 260 from the recess 270 to permit return movement of the pin setter frame without disturbing pins deposited upon the alley bed. The parts remain arranged in pin depositing position until the lower stop 260′ engages the ear 260 whereupon further upward movement of the pin setter frame causes the rod 256 to return the parts to normal position.

Mounted beneath the pin setter frame is a frame 261 of any preferred construction (Figs. 13 to 15) which carries ten magnets 262 normally disposed above the spots on the alley bed for use in removing the deadwood. The lower face of each of these magnets has a relatively large superficial area. On the top of each pin 263 is a small metallic element 264 adapted to be attracted by the magnet preparatory to the action of the sweeper in clearing the fallen pins. During the removal of deadwood the pin setter frame descends, carrying with it the magnet frame 261 to position the ten magnets directly above the spots upon the alley bed and at an appropriate height to permit them to just clear the tops of any standing pins that may be upon the alley. When in this position these magnets are energized and the metallic elements on the pins attracted thereto. When the pin setter frame returns again to normal position the magnets cause the standing pins to be lifted and the sweeper clears away those which have fallen. Each of these magnets is secured to and beneath suitable cross members 261′ of the frame 261 and one of the combined supports and guides 250 is secured to this cross member directly above the magnet. The combined supports and guides 250 each comprise a metallic spring-plate 265 disposed at a substantial distance above the cross member 261′ and bent down at its forward end into contact with an inclined guiding member or plate 266 which is fastened on the top of the corresponding transverse members 261′ of the frame.

When the pin setter frame is lowered beneath the height of the standing pins to just above the alley bed in the making of a new set the frame 261 is moved toward the rear of the alley to carry the magnets from beneath the pins in the pin setter frame. This movement is accomplished by a link 267 connected at one end 268 to the magnet carrying frame and at the other at 268′ to the arm of the bell-crank to which the link 254 is connected and which moves the lever 252 to raise the pins. The magnet frame is supported in the pin setter frame upon rollers 269 carried by upwardly extending arms 271 and engaging tracks or guides 272 on the pin setter frame. As the rearward movement of the magnet-carrying frame 261 occurs the pins in the pin setter frame are lifted by the rods 246 and 248 and slide down between the stationary guides 244 on the pin setter frame and the guiding plates 266 of the combined guides and supports 250. The pins are thus simultaneously lowered onto the alley bed and brought to upright position. They are slid gently into position on the alley bed without any appreciable jar and noise. In order that no damage may be done to the magnets in lifting the pins during the removal-of-deadwood operation they are loosely mounted in the magnet-carrying frame, as seen in Fig. 16. Each magnet 262 is suspended from the magnet-carrying frame by a pin 274 having an enlarged head 275 fitting in a suitable recess 276 in the frame and having a threaded lower end 277 engaging the core 278 of the magnet. A shoulder 279 engages the upper surface of the magnet cover 281 and is normally disposed beneath the cross member 261 a substantial distance so that the magnet may move upwardly somewhat as it contacts with the pin to be lifted. To prevent turning of the magnet on the pin 274 a locking pin 282 is secured in the cross member 261′ and fits loosely in a recess 283 in the magnet cover.

In Fig. 21 the electric circuits, switches and various mechanism and devices provided to interrupt and complete the several circuits incorporated in the machine to control the parts embodying my invention are diagrammatically disclosed. It is intended that the machine will perform the new-set or the removal of deadwood operation upon the pressing of an appropriate button or the throwing in of an appropriate switch located at player's end of the alley and that the machine shall perform all of its functions automatically and in accordance with the particular button pressed.

Two main normally open circuits are provided, one for controlling the machine during the removal of deadwood and the other in making a new set. The former circuit comprises a suitable source of electric energy, consisting in the present instance of a positive wire 291 and a negative wire 292. A wire 293 leads from the positive main line wire 291 to a blow-out 294 and a wire 295 connects this blow-out with a circuit opener 296 to be later described. From the circuit opener a wire 297 leads to the main or clutch magnet 117; from this magnet a wire 298 leads to the magnet 129 which unlocks the sweeper-directing cam 101 from the actuating sleeve or shaft 58, and from this magnet a wire 299 leads to one terminal 300 of the deadwood switch or button 301. The other terminal 302 of this button is connected to a magnet 303, the purpose of which will be later described, by a wire 304. A wire 305 connects this magnet with a terminal 306 affixed to and beneath the distributing frame above the pin setter frame. A terminal 307 is mounted upon the pin setter frame in position to contact with the terminal 306 when the pin setter frame is in upper position and this terminal is connected by a wire 308 with a terminal 309 positioned above and adjacent one of the pin rests 245 in the pin setter frame (Figs. 12, 13). This pin rest is pivotally mounted at its rear edge at 310 and is provided with a rearwardly extending arm 311. This arm is normally pulled downwardly by a spring 312 elevating the pin rest when no pin is positioned therein. The pin upon the rest, however, overcomes the force of this spring and brings the arm into contact with the terminal 309. This arm is connected by a wire 313 with a terminal 314 carried by the pin setter frame in position to engage a terminal 315 affixed to and beneath the distributing frame when the pin setter frame is in upper position. The terminal 315 is connected by a wire 316 to the negative main line wire 292 which completes the circuit. The pressing of the deadwood button, therefore, energizes the clutch magnet 117 and connects the sleeve 58 to the shaft 54 in the manner already described. It energizes also the magnet 129 and withdraws the sweeper locking pin 122 so that operation of the sweeper is delayed throughout the first half revolution of the sleeve 58. The other main circuit or the one for controlling the operation of the machine in making a new set comprises the wire 293, blow-out 294, circuit opener 296, wire 297 and main or clutch magnet 117. The wire 298, however, is connected with the sweeper-controlled magnet 128 by a wire 317 and this magnet is connected in turn to a terminal 318 by a wire 319. The terminal 318 is one of the terminals of the deadwood switch or button 321, the other terminal 322 of which is connected by a wire 323 with the wire 304. This circuit from this point to the negative main line wire is the same as that already described in connection with the circuit for controlling the operation in the removal of deadwood and particular description will, therefore, not be necessary.

The magnet 303 and the circuit opener 296 together prevent the starting of one operation of the machine before the next preceding one is completed. The circuit opener permits the circuit to remain closed throughout a part of the first half revolution of the shaft 54 and sleeve 58 after which the two circuits are positively opened by this circuit opener and maintained in open position until the operation of the machine is completed. The magnet 303 prevents the pressing of one of the buttons 301, 321 while the other circuit is closed.

The circuit opener consists in the present instance of a movable arm 324 (Figs. 4, 21). This arm is pivoted at 325 and rests at one end 326 upon a cam guide 327 secured upon the disk 106. This guide is of annular form and is depressed at 328 throughout materially less than 90 degrees. It is only when the end 326 of the arm rests in this depression that the circuit may be closed. The other end 329 of the arm engages one end 330 of a switch lever 331 which is pivoted at 332 in a suitable support 333. When the parts are in the position shown in Fig. 4, which is the position they assume when the machine is at rest, the circuit is closed at 334 and when the rotation of the disk 106 lifts the end 326 of the arm 324 a corresponding movement of the switch lever 331 will open the circuit at this point and maintain it open until the forward end of the depressed portion 328 again receives the end 326 of the arm 324. A suitable spring or other means 335 is provided to cause the lever to follow the end 329 of the arm 324 in its movement when the end 326 of this arm enters the depressed portion of the cam or guide 327.

The magnet 303 is provided to prevent the closing of one switch after the other has been closed and while the end 326 of the arm 324 is riding in the low portion of the cam or guide 327. Two levers 336 are pivoted at 337 adjacent each side of the magnet 303. One arm of one of these levers is connected to the push button or switch 301 and one arm of the other lever is connected to the push button or switch 321 so that depression of either push button will move its corresponding lever about its pivotal axis. The other arm of each lever is provided with an armature head 338 adapted to be attracted and held by the magnet 303 after the terminals 302 and 300 or the terminals 318 and 322 are in contact. When thus attracted and held the head of one lever is in the way of the head of the other so that the other switch can not close until the lever attracted by the magnet is released through the breaking of the current at the circuit opener 296. These two devices, therefore, prevent the starting of one operation until the next preceding one has been concluded as it is impossible to energize either magnet 128 or 129 except when the end 326 of the arm 324 is in the depressed portion of the cam guide 327 and when one of the magnets 128 and 129 is energized the magnet 303 is also energized and holds the lever 338 corresponding to the magnet 128, 129 at that time energized, so that the other lever 338 prevents closing of the two contacts at the push button controlling the other magnet. The circuit opener 296 performs another important function in positively preventing energization of either of the magnets 128, 129 after the initial step in the deadwood and new-set operations has been performed so that no interference with the automatic control of the machine can occur.

The construction of the distributing frame and the means of delivering a set of pins therefrom into the pin setter frame when the pin setter frame returns to normal position after depositing a set of pins upon the alley bed is also controlled by an electric circuit which is shown in Fig. 21. This circuit comprises a wire 339 connected at one end to the main line wire 291 and at the other to a terminal 340 which is adapted to contact with a leaf 341 when a set of pins rests in the distributing frame, the pins in the frame depressing the leaf into contact with the terminal 340. This terminal is connected by a wire 342 with a magnet 343 which, when energized, causes the pins in the distributing frame to be deposited in the pin setter frame through suitable mechanisms. From the magnet 343 a wire 344 leads to a terminal 345 affixed to and beneath the distributing frame in position to contact with the terminal 346 carried by the pin setter frame when the pin setter frame is in upper or normal position. The terminal 346 is connected by a wire 347 with a terminal 348 disposed beneath the arm 311 of the pin rest 245 which is pivotally mounted and which has already been described, so that when no pin is resting upon this leaf and the spring 312 pulls the arm 311 down out of contact with the terminal 309 contact is made with the terminal 348 and the circuit for delivering pins from the distributing frame to the pin setter frame is completed through the wire 313, terminals 314, 315 and wire 316 connected to the negative main line wire 292. It will be apparent that three conditions must be fulfilled to cause this circuit to be completed and the pins discharged from the distributing frame to the pin setter frame, these conditions being that pins be present in the distributing frame to cause contact between the terminals 340 and 341, that the pin setter frame be in upper or normal position so that the terminals 314 and 346 be in contact respectively with the terminals 315 and 345, and the third condition being that no pins be in the pin setter frame so that the arm 311 may contact with the terminal 348.

In bowling under the standard rules it is necessary that any pins left standing after the first ball has been rolled along the alley be left standing for the second ball. Should, however, a player in the excitement of the game press a new-set button after he has rolled the first ball along the alley and has failed to knock down all of the pins, it becomes necessary to replace the pins not knocked down by the first ball. In order that this may be readily accomplished without requiring an attendant to manually place them upon the alley bed I have provided a mechanism now to be described whereby the player by the pressing of suitable buttons located at the player's end of the alley may remove desired pins without disturbing the position of the others. This not only enables the correction of errors arising from the pressing of a new-set button when the button controlling the removal of deadwood should have been pressed but also permits the player to practise difficult shots and to roll the ball at desired combinations of pins at will. As has been stated the deadwood is removed by ten magnets 262 which in the normal operation of removing deadwood descend to the height of the standing pins, become energized and attract armatures provided in the tops of the pins and lift them above the alley bed while the sweeper clears off the fallen pins.

In order that particular pins may be removed when they are standing or lying upon the alley bed I provide means for individually as well as collectively energizing the magnets 262, the individual energization being for the purpose of correcting the errors due to the pressing of the wrong button and for practice purposes and the collective energization being for the purposes of lifting whatever standing pins may be left after the first ball has been rolled. The individual control for these magnets consists in the present instance of a wire 349 leading from the positive main line wire 291 to a fixed terminal 350 positioned to contact with a terminal 351 mounted upon the end of a lever or arm 352. One end 353 of this lever is positioned to engage a cam guide or rib 354 mounted upon the disk 106, said cam guide or rib extending substantially throughout 180 degrees and being positioned so as to cause the lever 352 to bring the terminals 351 and 350 into contact after the disk has received one-quarter revolution and to separate these terminals at the end of a three-quarter revolution of this disk so that the magnets are energized during the last half of the first and the first half of the second revolution of the sleeve 58. From the terminal 351 a wire 355 is connected singly by wires 356 to the magnets 262. From each magnet 262 a wire 357 leads to a fixed terminal 358 affixed to and beneath a shelf 359 on which are mounted the two switch buttons 301 and 321 of the main control circuits. Pivoted across one side of this shelf at 360 is a swinging extension or shelf 361 carrying ten buttons 362 arranged and numbered in accordance with the spots on the alley bed, as will be seen by viewing Fig. 17. Beneath the extension 361 ten flexible terminals 363 are provided each of which is adapted to contact with a corresponding terminal 358 when the extension is in the horizontal position shown in Figs. 18 and 19 and each of the terminals 363 is connected with a terminal 364 beneath an appropriate button 362 by a wire 365. A second terminal 366 mounted adjacent the terminal 364 is connected by a wire 367 with the negative main line wire 292, the two terminals 364 and 366 of each button being arranged to be electrically connected upon depression of the button. When, therefore, the buttons say for example 1, 4 and 10 are pressed an energization of the corresponding pin lifting magnets is produced when the pin setter frame reaches the bottom of its shorter travel in the deadwood operation, the other magnets being unenergized or dead. Upward movement of the frame carries with it the pins 1, 4 and 10 and the sweeper removes the remainder. If, therefore, the new-set button has been pressed when the deadwood operation should have been performed the desired pins only may be positioned upon the alley by the pressing of buttons corresponding therewith and then pressing the deadwood button 301. When the extension or shelf 361 is swung to the vertical position shown in dotted lines in Fig. 18 all of the buttons 362 are moved out of position to form contacts between the terminals 364 and 366 and these separate circuits, therefore, are broken and can not be completed again until the shelf is moved to horizontal position.

It is possible with the arrangement just described to leave desired individual circuits ready for completion during the deadwood operation when the lever 352 is moved by the cam guide to contact the terminals 350 and 351 so that repeated shots may be made at the same combination of standing pins in practice, it only being necessary that after each ball has been rolled along the alley bed that a new set of pins be set up and the deadwood button subsequently pressed to remove those undesired. The circuit common to all the pin-controlling magnets consists of the wire 349, terminals 350 and 351, wire 355, individual wires 356, 357, terminals 358, a bar 368 carried by the extension or shelf 361 in position to contact with all the terminals 358 when the shelf is in vertical position and a wire 369 connecting the bar 368 with a wire 367 which completes the circuit to the negative main line wire 292. Thus when the bar is down the pressing of the deadwood button causes the energization of all the pin lifting magnets and any pins left standing upon the alley bed after the first ball has been rolled will be temporarily lifted out of the way of the sweeper.

The operation of the machine will be better understood from the following brief description. Twenty-nine pins are employed in the machine and it may be assumed that they are disposed as follows, ten pins in the pin setter, ten pins in the distributer frame and nine pins upon the assembly shelf. The motor 52 is started to furnish the necessary power and the machine is ready for operation.

The player takes his position at the player's end of the alley and presses the new-set button 321 which, through the mechanism previously described, causes the sweeper blade 84 to sweep the alley bed to insure that it is clear of pins and balls. The pin setter then descends and deposits a set of pins upon the spots on the alley bed and returns to its normal position. This is the new-set operation. The player rolls a ball along the alley bed, knocking down some of the pins.

The next operation is that of removing "deadwood" from the alley bed and gutters and to accomplish this the player presses the button 301 which, through the mechanism previously described, causes the pin setter to descend until the magnets 262 are just clear of the heads of the standing pins. The magnets 262 are simultaneously energized and as the pin setter ascends the standing pins are lifted from the alley bed. The sweeper blade 84 then operates to sweep the "deadwood" into the pit, and as the sweeper blade returns to normal position the setter frame again descends to replace the lifted pins in position upon the alley bed from which they were lifted after which it returns to normal elevated position. The player may then continue the play. Meanwhile the movable members 163 carry the balls and pins in the alley pit to the continuously moving conveyer 181 which elevates the balls and pins and deposits the balls on the ball-return track 202. The pins are delivered to the chute 205 which delivers them to the conveyer 207. The pins are moved by the conveyer 207 onto the assembly shelf 206 upon which they are retained until a full set of ten pins has been assembled.

We have assumed that ten pins are disposed on the distributer frame and as the pin setter returns after depositing a set of pins upon the alley bed in the new-set operation these pins will be automatically released and will fall into the pin setter in readiness for another new-set operation. We have also assumed that nine pins are assembled on the assembly shelf. As soon as the tenth pin is delivered by the conveyer 206 onto the assembly shelf the pins will be automatically released and will pass by way of the chutes 222 and 223 to the distributer frame which is free to receive them owing to the previous passage of the set of pins thereon to the pin setter. The assembly shelf is then free to receive a new set of pins which are delivered thereto one by one as they are elevated from the alley pit. Inasmuch as twenty-nine pins are employed and the pins are not released from the assembly shelf until a full set of ten pins has been assembled it will be apparent that a set of pins can not be delivered to the distributer frame so long as a full set of pins is carried by the pin setter and distributer frame and that inasmuch as the pins on the distributer frame are released to the setter as soon as the latter has deposited the pins contained therein the distributer frame will always be in condition to receive a set of pins when a full set has been assembled on the assembly shelf. The number of pins employed may, however, be depleted by breakage or otherwise within reasonable limits without affecting the rapidity of the play. By means of the buttons 362 appropriately connected in the circuits of the magnets 262 the player is enabled to select the pins to be lifted thereby during the deadwood removal operation, the remaining pins being removed by the sweeper blade 84 so that selected pins may be set upon the alley bed in any desired arrangement conforming to the wish of the player without leaving the player's end of the alley.

It will be obvious that various changes may be made in the devices, mechanisms and circuits described without departing from the spirit or scope of the invention or sacrificing any of its material advantages, the forms hereinbefore disclosed being merely preferred embodiments thereof.

I claim:

1. In a pin setting machine for a bowling alley, the combination of a pin setter adapted to deposit a set of pins on the alley bed, and means for operating the same, said machine comprising a driving element, a rotatable member mounted on the driving element and normally locked thereto, and stationary means for unlocking said member from said driving element.

2. In a pin setting machine for a bowling alley, the combination of a sweeper adapted to clear the alley bed, and means for operating the same, said means comprising a driving element, a member mounted on said driving element and normally locked thereto, and stationary means for unlocking said member from said driving element.

3. In a pin setting machine for a bowling alley, the combination of a pin setter adapted to deposit a set of pins on the alley bed, a sweeper adapted to clear the alley bed, a driving element, means for operating the setter, means for operating the sweeper, both said means being normally locked to said driving element, and stationary means for unlocking said setter-controlling means and said sweeper-controlling means from said driving element.

4. In a pin setting machine for a bowling alley, the combination of a pin setter adapted to deposit a set of pins upon the alley bed, means for operating the same, said means comprising a normally idle driving element, means for imparting rotation to said driving element, a member mounted on said driving element and normally locked thereto, and a stationary magnet disposed adjacent said member and adapted to unlock said member from said driving element.

5. In a pin setting machine for a bowling alley the combination of a sweeper adapted to clear the alley bed, and means for operating said sweeper, said means comprising a driving element normally at rest, means for imparting rotation to the driving element, a member mounted on and normally locked to said driving element, and a stationary magnet for unlocking said member from said driving element.

6. In a pin setting machine for a bowling alley, the combination of a pin setter adapted to deposit a set of pins in position upon the alley, a sweeper adapted to clear the alley bed, and means for operating said setter and sweeper, said means comprising a driving element, a sweeper-actuating member mounted on said driving element and normally locked thereto, a setter-actuating member mounted on said driving element and normally locked thereto, and a pair of stationary magnets, one for the setter-actuating member and one for the sweeper-actuating member, adapted to unlock these members from said driving element.

7. In a pin setting machine for a bowling alley, the combination of a vertically movable frame having travels of different lengths, and means for moving said frame and controlling the length of its travel, said means comprising an oscillatory member, a driving rod shiftably connected to said oscillatory member and adapted to be moved toward and from the center of oscillation, a member for shifting said driving rod, means for locking said driving rod in desired position, and means connected to said longitudinally movable rod for unlocking said locking device.

8. In a pin setting machine for a bowling alley, the combination of a vertically movable frame having travels of different lengths, and means for moving said frame and controlling the length of its travel, said means comprising a bell-crank, a driving rod shiftably connected at one end to an arm of said bell-crank, a device for locking said driving rod in desired position, a longitudinally movable rod for shifting said driving rod, and means connected to said longitudinally movable rod for unlocking said locking device.

9. In a pin setting machine for a bowling alley, the combination of a vertically movable frame having travels of different lengths, and means for moving said frame and controlling the length of its travel, said means comprising an oscillatory member, a driving rod shiftably connected to said oscillatory member and adapted to be connected at different distances from the center of oscillation of said oscillatory member, a longitudinally movable rod for shifting said driving rod, a locking device for locking said driving rod to said oscillatory member in desired position, a lever pivoted adjacent said locking device, and a link connecting said lever with said longitudinally movable rod to move said lever into position to unlock said locking device.

10. In a pin setting machine for a bowling alley, the combination of a sweeper adapted to clear the alley bed, and means for operating the same, said sweeper comprising a frame adapted to move above the alley bed, and a blade loosely depending from said frame to adjacent the alley bed and held against movement relative to the frame in one direction when the sweeper is moved across the alley bed.

11. In a pin setting machine for a bowling alley, the combination of a sweeper, and means for operating the same, said sweeper comprising a blade loosely depending from said frame, and means carried on the frame for engaging behind the blade to push the sweeper across the alley during its sweeping stroke.

12. In a pin setting machine for a bowling alley, the combination of a sweeper adapted to clear the alley bed, and means for operating the same, said sweeper comprising a frame carrying a sweeper blade at one end, a pair of links connected at one end to the other end of said sweeper frame and at the other end to a stationary pivot, a shaft, a pair of arms mounted on the shaft and connected at their ends to the sweeper frame between its ends.

13. The combination of means for setting the pins upon the alley bed of a bowling alley, and a bowling alley pit bottom having stationary members, and a member moving up and down with respect to said stationary members, the movement of said moving member above said stationary members serving to advance the pins across the pit.

14. The combination of means for setting pins upon the alley bed of a bowling alley, and a bowling alley pit bottom having a plurality of upwardly extending ribs, a movable member mounted between each pair of adjacent ribs, and means for lifting said moving members above the ribs and toward the rear of the pit to lift pins from the ribs and carry them rearwardly across the pit.

15. The combination of means for setting pins upon the alley bed of a bowling alley, a bowling alley pit bottom having a plurality of upwardly extending ribs, movable members mounted between said ribs, a cam secured to each end of each movable member for lifting the end of the movable member above the stationary members and toward the rear of the alley pit to lift pins from the ribs and carry them across the pit.

16. In a pin setting machine for a bowling alley, the combination of means for setting the pins upon the alley bed, and means for delivering pins from the alley pit, said delivery means comprising stationary members mounted in the alley pit, movable members mounted in the alley pit and disposed between said stationary members, a continuously moving member, a pair of shafts rotatably disposed through the stationary members and carrying cams disposed in the movable members, and means connecting said shafts to said continuously moving member to impart a movement to said moving means up and down past the upper surfaces of said stationary members, the movement of said moving members above said stationary members serving to advance the pins across the pit.

17. In a pin setting machine for a bowling alley, the combination of means for removing broken pins from the alley pit, and means for discharging them from the machine.

18. In a pin setting machine for a bowling alley, the combination of an incline sloping to the alley return track and having a plurality of apertures therethrough, and means for lifting the balls and broken pins to said incline to permit the balls to roll down the incline to the return track and the broken pins to drop through the apertures in the incline out of the machine.

19. In a pin setting machine for a bowling alley, the combination of means for setting the pins, and means for delivering pins from the alley pit to said setting means, said last-mentioned means comprising means for sorting the broken pins from the whole pins.

20. In a pin setting machine for a bowling alley, the combination of an endless movable carrier, a casing in which said carrier moves throughout a portion of its travel having an unobstructed aperture adjacent the travel of said carrier of appropriate size to permit broken pins to pass therethrough and to prevent whole pins from passing therethrough.

21. In a pin setting machine for a bowling alley, the combination of an endless vertically movable carrier for elevating the pins above the alley pit, a casing surrounding a portion of said carrier, and means for accurately positioning the pins in said carrier.

22. In a pin setting machine for a bowling alley, the combination of an endless vertically movable carrier for elevating the pins from the alley pit, a casing surrounding a portion of said carrier and a centering device for placing the pins accurately in the carrier located on said casing at each side of said carrier and adjacent the bottom of its upward travel.

23. In a pin setting machine for a bowling alley, the combination of an endless vertically movable carrier for elevating the pins above the alley pit, a casing in which said carrier travels, and means carried by said casing to center the pins on the flights adjacent the bottom of the upward travel of said carrier.

24. In a pin setting machine for a bowling alley, the combination of an endless vertically movable carrier for elevating pins from the alley pit, and a casing in which said carrier moves throughout a portion of its upward travel, the side walls of said casing being recessed and provided with cam surfaces adapted to engage pins when improperly centered in the carrier and to accurately position them as they are carried past said cam surfaces.

25. In a pin setting machine for a bowling alley, the combination of an endless vertically movable carrier provided with a plurality of flights of width substantially equal to the length of a pin, a casing surrounding a portion of said carrier and means for accurately positioning the pins lengthwise upon the flights.

26. In a pin setting machine for a bowling alley, the combination of an endless vertically movable carrier provided with a plurality of flights having a curved upper face and of length equal substantially to the length of a pin, and means for accurately positioning the pins on the flights.

27. In a pin setting machine for a bowling alley, the combination of means for setting the pins, and means for conveying the pins from the alley pit to said setting means and for conveying the balls to the return track, said conveying means comprising an endless carrier disposed in a vertical plane of width equal substantially to the length of a pin, a casing in which said carrier moves throughout a portion of its travel having an opening in its side of width sufficient to permit a ball to pass therethrough and of insufficient width to permit a pin resting in the carrier to pass therethrough.

28. In a pin setting machine for a bowling alley, the combination of a vertically movable carrier for elevating the balls from the alley bed to the return track, and a wall adjacent said carrier adapted to be engaged by the balls during the upward movement of the carrier for maintaining the balls in accurate position thereon.

29. In a pin setting machine for a bowling alley, the combination of a vertically movable carrier for elevating the balls from the alley bed to the return track, and a wall adjacent said carrier having a longitudinally disposed recess for centering the balls on the carrier.

30. In a pin setting machine for a bowling alley, the combination of a vertically movable carrier for elevating the balls from the alley pit to the alley return track, and a casing in which said carrier moves through a portion of its upward travel, said casing being provided with a longitudinally extending recess in a wall adjacent said carrier and having an aperture disposed adjacent said return track and of sufficient size to permit a ball to pass therethrough communicating with said recess, whereby the ball may be centered in the carrier by said recess and rolled out of the aperture to the return track.

31. In a pin setting machine for a bowling alley, the combination of means for setting the pins, and means for conveying the pins from the alley pit to the setting means and for conveying the balls to the alley return track, said conveying means comprising an endless vertically movable carrier, a casing in which said carrier moves throughout a portion of its travel, the wall adjacent said carrier being provided with a longitudinally extending recess for centering a ball in the carrier, said recess being of less width than the length of a pin, and means for positioning pins across said recess.

32. In a pin setting machine for a bowling alley, the combination of a pin setter, and means for conveying pins from the alley pit to said setter, said means comprising a carrier for elevating the pins provided with a plurality of flights of length substantially equal to the length of a pin, said flights being cut away at the top to provide a curved surface to receive the pins and cut away beyond the ends of said curved surface to provide rests for the heads of the pins.

33. In a pin setting machine for a bowling alley, the combination of means for setting the pins, and means for delivering pins from the alley pit to said setting means, said delivery means comprising a carrier provided with a plurality of flights, a casing in which said carrier moves throughout a portion of its upward travel, and a chute for receiving the pin over the top of said casing, said flights being constructed to arrange the pins in the chute with their head ends always pointing in the same direction.

34. In a pin setting machine for a bowling alley, the combination of means for setting the pins, and means for delivering the pins from the alley pit to said setting means, said delivery means comprising a vertically movable carrier, a casing in which said carrier moves throughout a portion of its upward travel, and a chute located adjacent the top of said casing for receiving pins from the flights over the casing, each of said flights being constructed to retain the head end of a pin until the butt end has left the flight.

35. In a pin setting machine for a bowling alley, the combination of means for setting the pins, and means for delivering the pins from the alley pit to said setting means, said delivery means comprising a carrier provided with a plurality of flights cut away at its top adjacent the ends to provide head-rests for the pins, means for accurately positioning the pins on the flights, a casing in which said carrier moves throughout a portion of its upward travel, and a chute adjacent the top of said casing to receive the pins from the flights over the casing, said head-rests on the flights serving to maintain the heads of the pins until the butt ends have left the flights.

36. In a pin setting machine for a bowling alley, the combination of means for setting the pins, and means for delivering pins from the alley pit to said setting means and for conveying the balls to the alley return track, said means comprising a carrier provided with a plurality of flights curved on their upper surfaces to receive the pins and balls and formed at the ends of said curved surfaces to provide head-rests for the pins.

37. In a pin setting machine for a bowling alley, the combination of a conveyer for elevating pins and balls, and a casing in which said conveyer moves throughout a portion of its travel, a portion of said casing being provided with a sound-deadening material.

38. In a pin setting machine for a bowling alley, the combination of a conveyer for elevating the pins and balls, and a casing in which said conveyer moves throughout a portion of its travel, a portion of said casing consisting of a plurality of metal plates spaced apart, and a sound-deadening material disposed between said plates.

39. In a pin setting machine for a bowling alley, the combination of an assembly shelf, a device for delivering pins to an end of said shelf, a conveyer adapted to engage a portion of the pin, and means operable with said conveyer to engage a second portion of the pin to move the pin from said device onto said shelf.

40. In a pin setting machine for a bowling alley, the combination of an assembly shelf, a device adapted to deliver pins to an end of said shelf, and means for engaging the bodies and heads of the pins for moving them from said device onto said assembly shelf.

41. In a pin setting machine for a bowling alley, the combination of an assembly shelf, a device for delivering pins to an end of said shelf, a conveyer for engaging the bodies of the pins to move them from said device onto the shelf, and means for engaging the heads of the pins to cause the pins to move onto the shelf in predetermined position.

42. In a pin setting machine for a bowling alley, the combination of an assembly shelf, a device for delivering pins to an end of said shelf, means for retaining the heads of the pins in elevated position within said device, and means for engaging the head and body of the pin to move the pin onto said shelf.

43. In a pin setting machine for a bowling alley, the combination of an assembly shelf, a device adapted to deliver pins to an end of said shelf, a sprocket wheel, a conveyer trained over said sprocket wheel and adapted to engage the pins to move them onto the shelf, and means secured to the sprocket wheel for engaging the head of the pin to maintain the pin in predetermined position while it is moved from said device to said shelf by said conveyer.

44. In a pin setting machine for a bowling alley, the combination of an assembly shelf, a device adapted to deliver pins to an end of said shelf, a sprocket wheel disposed adjacent said device and provided with a plurality of outwardly extending blades adapted to engage the head of a pin resting in said device, and a conveyer having a plurality of blades arranged to coöperate with the blades on the sprocket wheel so that every time a blade on the sprocket wheel engages the head of a pin a blade on the conveyer will engage its body and the two blades move the pin from said device to the shelf.

45. In a pin setting machine for a bowling alley, the combination of an assembly shelf, a conveyer disposed across said shelf and provided with a plurality of outwardly extending pivotally mounted blades adapted to move the pins on the shelf, and sprockets over which said conveyer is trained, each of said blades being provided with a rearwardly extending reinforce adapted to engage the body of said conveyer when a blade is operatively arranged with respect to a pin and to separate from said body of the conveyer when the blade travels around the sprocket.

46. In a pin setting machine for a bowling alley, the combination of an assembly shelf, and means for delivering pins thereon, said assembly shelf comprising a framework having a longitudinal member adapted to receive the heads of the pins and a second longitudinal member adapted to receive the bodies of the pins.

47. In a pin setting machine for a bowling alley, the combination of an assembly shelf pivotally mounted at its ends, an abutment disposed adjacent an edge of said shelf and spaced therefom, said shelf comprising a framework having a longitudinal member adapted to rest beneath the heads of the pins and a second longitudinal member adapted to rest beneath the bodies of the pins when the pins abut against said abutment.

48. In a pin setting machine for a bowling alley, the combination of a distributer, an assembly shelf, a plurality of chutes leading from said assembly shelf to said distributer, certain of said chutes being higher adjacent the shelf than others, an abutment disposed above the lowermost chutes and adjacent said shelf and provided with apertures opposite the higher chutes, said shelf comprising a framework pivotally mounted at its ends and having forwardly extending hollow projections opposite the apertures in said abutment, upwardly extending members at the edge of said projections adapted to close the apertures in the abutment when the shelf is in normal position, and means disposed through said projections for retaining pins opposite said apertures substantially stationary when the shelf tilts until the members closing the apertures in said abutment have passed beneath the pins.

49. In a pin setting machine for a bowling alley, the combination of a vertically movable pin setter adapted to receive the pins in reclining position, members disposed beneath the necks of said pins, and a device connected to said members for moving them to elevate the pins to upright position to permit them to be deposited upon the alley bed, said device comprising a pivotally mounted member, a rod connected to said pivotally mounted member, a fixed element in which said rod is mounted to slide as the setter is moved vertically, said rod and element being formed for mutual engagement at a fixed point in the travel of said setter to cause further travel of the setter to move said members to deposit the pins, and means mounted on said pivotally mounted member for disengaging said rod and element upon return travel of the setter.

50. In a pin setting machine for a bowling alley, the combination of a vertically movable pin setter adapted to receive the pins in reclining position, members disposed beneath the neck of said pins, a device connected to said members for moving them to elevate the pins to upright position to permit them to be deposited upon the alley bed, and a fixed element, said device comprising a pivotally mounted member, a rod connected to said pivotally mounted member and adapted to interlock with said fixed element at a predetermined point in the travel of said setter to move the pivotally mounted member and lift the pins, and a member mounted on said pivotally mounted member and adapted to engage said rod at a predetermined point in the return travel of said setter to unlock said rod and said fixed element.

51. In a pin setting machine for a bowling alley, the combination of a movable frame, guides in number equal to the number of pins to be set upon the alley at one time fixed in said frame in accordance with the arrangement of the spots on an alley bed, a movable guide disposed adjacent each fixed guide and adapted to support a pin in reclining position with its butt end adjacent the fixed guide, and means operable as the frame reaches depositing position for simultaneously lifting the heads of the pins and moving the movable guides to right the pins and deposit them upon the spots on the alley bed.

52. In a pin setting machine for a bowling alley, the combination of a movable frame, guides in number equal to the number of pins to be set upon the alley at one time fixed in said frame in accordance with the arrangement of the spots on an alley bed, a pin rest disposed adjacent each fixed guide, and a movable guide disposed beneath each pin rest and adapted to coöperate with said pin rest to support a pin in reclining position with its butt end adjacent said fixed guide, and means for simultaneously moving said movable guides and elevating the head of the pin to simultaneously right the pin and slide it into position upon the alley bed.

53. In a pin setting machine for a bowling alley, the combination of a vertically movable frame provided with a rest for each pin to the set upon the alley, a guide positioned forwardly of each rest, a movable member disposed beneath each rest in position to retain a pin carried on the rest, and means for moving said members and simultaneously elevating the heads of the pins when the frame is moved to adjacent the alley bed to lift the pins from the rest and permit them to be deposited upon the alley bed.

54. In a pin setting machine for a bowling alley, the combination of a vertically movable frame adapted to receive a set of pins arranged in accordance with the arrangement of the spots upon the alley bed, a guide disposed forwardly of each pin positioned in said frame, a plurality of inclined members mounted beneath said frame to slide in unison and normally positioned beneath the pin positions in said frame, and means for simultanenously moving said pin lifting means to lift the pins to upright position and for shifting said inclined members beneath the frame to permit the pins to slide into position on the alley bed as they are righted.

55. In a pin setting machine for a bowling alley, the combination of a vertically movable frame adapted to receive the pins in reclining position and arranged in accordance with the arrangement of the spots on the alley bed, a member positioned to receive the neck of each pin, a plurality of shifting guides disposed beneath said frame to move in unison, said guides having a flat top and an inclined side, and means for lifting the members adapted to be disposed beneath the necks of the pins and for shifting said movable guides to right the pins and slide them down the inclined side of the guides into position upon the alley bed.

56. In a pin setting machine for a bowling alley, the combination of a vertically movable frame adapted to receive the pins in reclining position and arranged in accordance with the arrangement of the spots on the alley bed, a fixed guide disposed forwardly of each pin position and a movable guide disposed beneath each pin position, said movable guide being provided with a flat top and an inclined side, and means for righting the pins against the fixed guide and for moving the inclined guide from the fixed guide whereby to right the pins and slide them into position upon the alley bed.

57. In a pin setting machine for a bowling alley, the combination of a vertically movable frame adapted to receive the pins in reclining position and arranged in accordance with the arrangement of the spots on the alley bed, a fixed inclined guide disposed forwardly of each pin position and a movable guide disposed beneath each pin position, said movable guide being provided with a flat top and an inclined side and means operable by movement of the frame for righting the pins against the fixed inclined guide and for moving the inclined movable guide from the fixed inclined guide to right the pins and slide them into position upon the alley bed.

58. In a pin setting machine for a bowling alley, the combination of a vertically movable pin setter, and a plurality of pin lifting magnets carried thereby, said setter being adapted to receive a set of pins in inclined position and arranged in accordance with the arrangement of the spots on the alley bed, said magnets being normally disposed beneath the pin positions in the setter and each provided with a guide for directing the pins into position on the alley bed, and means for moving the magnets and the guides carried thereby for righting the pins to permit the pins to slide past the magnets and down the fixed guides into position on the alley.

59. In a pin setting machine for a bowling alley, the combination of means for depositing a desired and variable number of pins upon the alley bed, and means for clearing the alley prior to the positioning of said pins.

60. In a pin setting machine for a bowling alley, the combination of means for depositing a desired and variable number of pins on the alley bed in desired and variable arrangement, and means for clearing the alley prior to the positioning of said pins.

61. In a pin setting machine for a bowling alley, the combination of means for depositing the desired number of a set of bowling pins upon the alley bed, and means for disposing of the remaining pins of said set.

62. In a pin setting machine for a bowling alley, the combination of means for depositing pins upon desired spots only on the alley bed, and means for disposing of the remaining pins of the set.

63. In a pin setting machine for a bowling alley, the combination of means for placing a set of pins upon the alley bed in standing position, and means for removing desired pins without disturbing the relative positions of the remainder.

64. In a pin setting machine for a bowling alley, the combination of a set of bowling pins, and means controllable from a distant point for positioning pins only upon desired spots on the alley bed.

65. In a pin setting machine for a bowling alley, the combination of means for placing a full set of pins upon the alley bed in standing position, means for lifting desired pins above the alley bed, and means for sweeping from the alley bed the pins left standing thereon.

66. In a pin setting machine for a bowling alley, the combination of a plurality of devices each adapted to lift a pin standing upon the alley bed above the alley bed, and means for individually rendering said devices inoperative to permit desired pins only to be raised above the alley bed.

67. In a pin setting machine for a bowling alley, the combination of means for setting the pins in proper position on the alley bed, means for removing the deadwood from the alley bed, and devices for controlling said means to replace desired pins upon the alley bed to correct mistakes due to the inopportune actuation of the means for placing a new set of pins upon the alley bed.

68. In a pin setting machine for a bowling alley, the combination of a plurality of magnets adapted to lift standing pins temporarily above the alley bed, a sweeper adapted to clear the alley bed while said pins are lifted, means for rendering all said magnets operative, and means for rendering desired magnets only operative.

69. In a pin setting machine for a bowling alley, the combination of a plurality of magnets adapted to lift standing pins temporarily above the alley bed, a sweeper adapted to clear the alley bed while said pins are lifted, means located at player's end for rendering all said magnets operative, and means for rendering desired magnets only operative.

70. In a pin setting machine for a bowling alley, the combination of a plurality of magnets adapted to temporarily lift pins standing upon the alley bed above the alley bed, and means for clearing the alley bed while said pins are lifted, said magnets each being provided with a separate energizing circuit adapted to be individually closed.

71. In a pin setting machine for a bowling alley, the combination of a plurality of magnets adapted to temporarily lift pins standing upon the alley bed above the alley bed, and means for clearing the alley bed while said pins are lifted, said magnets each being provided with a separate energizing circuit adapted to be individually closed at the player's end of the alley.

72. In a pin setting machine for a bowling alley, the combination of a plurality of magnets adapted to temporarily lift pins standing upon the alley bed above the alley bed, and means for clearing the alley bed while said pins are being lifted, said magnets being connected to a common energizing circuit and each having a separate energizing circuit, and means for closing the common circuit or the individual circuit of desired magnets.

73. In a pin setting machine for a bowling alley, the combination of a plurality of magnets adapted to lift pins standing upon the alley bed above the alley bed, and means for clearing the alley bed while said pins are lifted, said magnets having a common energizing circuit and each having an individual energizing circuit, said circuits being connected through a movable member adapted to permit the closing of the common energizing circuit when in one position and adapted to permit the closing of the individual circuits when in a second position.

74. In a pin setting machine for a bowling alley, the combination of a plurality of magnets adapted to temporarily lift pins standing upon the alley bed above the alley bed, means for clearing the alley bed while said pins are lifted, an indicating board provided with a plurality of electric circuit closers arranged in accordance with the spots on the alley bed, and an individual circuit for energizing each magnet, said circuit being adapted to be connected through its corresponding electric circuit closer on said indicating board.

75. In a pin setting machine for a bowling alley, the combination of a pin setter adapted to place a plurality of pins upon the alley bed, a sweeper adapted to clear the alley bed prior to the action of said setter, and means for controlling and timing the operation of said sweeper and setter, said means comprising a driving element to which said setter and sweeper are normally locked, an electromagnet for temporarily unlocking said setter from said driving element, an electric circuit controlling said magnet, said circuit comprising a normally closed circuit-completing device, and means for opening said circuit-completing device at a predetermined point in the operation of the machine.

76. In a pin setting machine for a bowling alley, the combination of means for automatically and temporarily lifting pins upon the alley bed above the alley bed, means for sweeping the alley bed while said pins are lifted, and means for controlling and timing the operation of said lifting means and sweeper, said controlling and timing means comprising a driving element to which said lifting means and said sweeper are connected, an electromagnet for disconnecting said lifting means from said driving element, and a circuit for energizing said magnet, said circuit comprising an electric circuit-closing device normally closed, and means for opening said device at a predetermined point in the operation of the machine.

77. In a pin setting machine for a bowling alley, the combination of a pin setter adapted to place a plurality of pins upon the alley bed, a sweeper adapted to clear the alley bed prior to the action of said setter, and means for controlling and timing the operation of said sweeper and setter, said means comprising a driving element to which said setter and sweeper are normally locked, an electromagnet for temporarily unlocking said sweeper from said driving shaft, and an electric circuit controlling said magnet, said circuit comprising a normally closed circuit-completing device, and means for opening said circuit-completing device at a predetermined point in the operation of said machine.

78. In a pin setting machine for a bowling alley, the combination of means for temporarily lifting standing pins upon the alley bed above the alley bed, means for sweeping the alley bed while said pins are lifted, and means for controlling and timing the operation of said lifting means and sweeper, said controlling and timing means comprising a driving element to which said lifting and sweeping means are connected, an electromagnet for disconnecting said sweeper from said driving element, and a circuit for energizing said magnet, said circuit including an electric circuit-closing device normally closed, and means for opening said device at a predetermined point in the operation of said machine.

79. In a pin setting machine for a bowling alley, the combination of a vertically movable frame having travels of different lengths in different operations of the machine, means imparting said travels to said frame, a sweeper, means moving said sweeper to clear the alley, and a member operable by said sweeper-moving means for varying the travel of the frame.

80. In a pin setting machine for a bowling alley, the combination of a vertically movable frame adapted to travel different distances in different operations of the machine, means for actuating said frame, means for controlling the distance traveled by said frame, a sweeper, means for moving said sweeper to clear the alley, and means operable by said sweeper-moving means to actuate said frame-controlling means.

ERNEST HEDENSKOOG.

Witnesses:
Wm. O. Belt,
M. A. Kiddie.